US008566642B2

(12) United States Patent
Ohara

(10) Patent No.: US 8,566,642 B2
(45) Date of Patent: *Oct. 22, 2013

(54) STORAGE CONTROLLER AND DATA ERASING METHOD FOR STORAGE DEVICE

(75) Inventor: Mao Ohara, Odawara (JP)

(73) Assignee: Hitachi, Ltd., Tokyo (JP)

( * ) Notice: Subject to any disclaimer, the term of this patent is extended or adjusted under 35 U.S.C. 154(b) by 397 days.

This patent is subject to a terminal disclaimer.

(21) Appl. No.: 12/987,808

(22) Filed: Jan. 10, 2011

(65) Prior Publication Data

US 2011/0107144 A1 May 5, 2011

Related U.S. Application Data

(63) Continuation of application No. 12/987,808, filed on Jan. 10, 2011, which is a continuation of application No. 12/270,893, filed on Nov. 14, 2008, now Pat. No. 7,873,870.

(30) Foreign Application Priority Data

Sep. 19, 2008 (JP) ................................. 2008-240316

(51) Int. Cl.
G06F 11/00 (2006.01)
(52) U.S. Cl.
USPC .................. 714/16; 714/2; 714/6.11; 714/6.2
(58) Field of Classification Search
USPC .......................................... 714/2, 6.11, 6.2, 16
See application file for complete search history.

(56) References Cited

U.S. PATENT DOCUMENTS

| 6,507,911 | B1 | 1/2003 | Langford |
| 6,584,579 | B1 | 6/2003 | Komatsu et al. |
| 7,216,207 | B1 | 5/2007 | Armstrong-Crews et al. |
| 7,376,062 | B2 | 5/2008 | Hsu et al. |
| 7,469,327 | B2 | 12/2008 | Kawamura et al. |
| 7,636,724 | B2 * | 12/2009 | de la Torre et al. ................. 1/1 |
| 7,739,462 | B2 | 6/2010 | Dewey |

(Continued)

FOREIGN PATENT DOCUMENTS

| JP | 10-207641 | 8/1998 |
| JP | 2003-345526 | 12/2003 |

(Continued)

OTHER PUBLICATIONS

Office Action issued in Japanese Patent Application No. 2008-240316 on Feb. 15, 2011.

*Primary Examiner* — Charles Ehne
(74) *Attorney, Agent, or Firm* — Antonelli, Terry, Stout & Kraus, LLP.

(57) ABSTRACT

A storage controller changes a block size to carry out a shredding process. A data shredder uses a large block size BSZ1 set by a block size setting part to write shredding data in a storage area of a disk drive and erase data stored therein. An error arising during the writing operation of the shredding data is detected by an error detecting part. When the error is detected, the block size setting part sets the block size smaller by one stage than the initial block size to the data shredder. Every time the error arises, the block size used in the shredding process is diminished. Thus, the number of times of writings of the shredding data is reduced as much as possible to improve a processing speed and erase the data of a wide range as much as possible.

24 Claims, 29 Drawing Sheets

(56) References Cited

U.S. PATENT DOCUMENTS

| | | | |
|---|---|---|---|
| 8,069,317 B2 * | 11/2011 | Boyd et al. | 711/156 |
| 2005/0190599 A1 * | 9/2005 | Eggleston et al. | 365/185.11 |
| 2006/0095380 A1 * | 5/2006 | Hsu et al. | 705/57 |
| 2006/0095688 A1 | 5/2006 | Kawamura et al. | |
| 2006/0215458 A1 * | 9/2006 | Takeuchi | 365/185.25 |
| 2006/0268635 A1 | 11/2006 | Murakoshi et al. | |
| 2007/0047395 A1 | 3/2007 | Skeeter et al. | |
| 2007/0079078 A1 | 4/2007 | Fujita et al. | |
| 2007/0168321 A1 | 7/2007 | Saito et al. | |
| 2008/0030755 A1 | 2/2008 | Kortenoeven et al. | |
| 2008/0183950 A1 * | 7/2008 | Roohparvar | 711/103 |
| 2010/0077171 A1 * | 3/2010 | de la Torre et al. | 711/166 |
| 2010/0083069 A1 * | 4/2010 | Wylie et al. | 714/752 |

FOREIGN PATENT DOCUMENTS

| | | |
|---|---|---|
| JP | 2005-250700 | 9/2005 |
| JP | 2005-266871 | 9/2005 |
| JP | 2005-313568 | 11/2005 |
| JP | 2005-321952 | 11/2005 |

* cited by examiner

FIG. 6

| | T12 BLOCK SIZE MANAGEMENT TABLE FOR SHREDDING | |
|---|---|
| C15 SERIAL NUMBER | C16 BLOCK SIZE |
| 1 | 1GB |
| 2 | 256MB |
| 3 | 64MB (DEFAULT) |
| 4 | 16MB |
| 5 | 4MB |
| 6 | 1MB |
| 7 | 256KB |
| 8 | 64KB |
| 9 | 16KB |
| 10 | 4KB |
| 11 | 1KB |

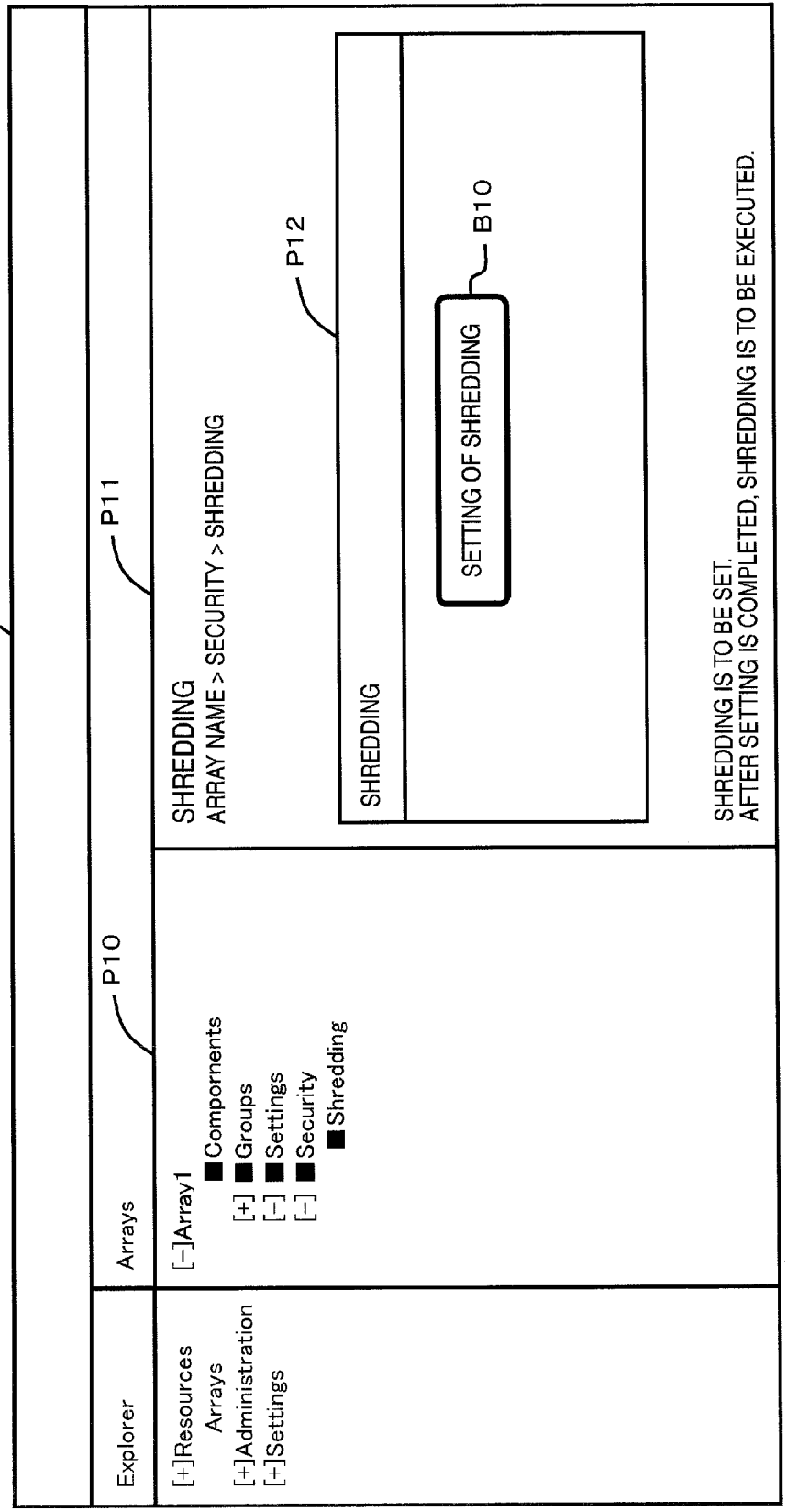

(1) UNIT OF DEVICE THAT CARRIES OUT SHREDDING PROCESS    ◎HDD  ○RG  ○LV — P20

P21

| | HDD# | SIZE | RG# | |
|---|---|---|---|---|
| ■ | 0000 | 250GB | 01 | RAID5 (4D+1P) |
| ☐ | 0001 | 250GB | 01 | RAID5 (4D+1P) |
| ☐ | 0002 | 500GB | 01 | RAID5 (4D+1P) |
| ☐ | 0003 | 500GB | 01 | RAID5 (4D+1P) |
| | | | | |

HDD LIST (2) ALGORITHM OF SHREDDING    P22

ALGORITHM LIST

| | NAME OF ALGORITHM | NUMBER OF TIMES OF WRITING | WRITING PATTERN |
|---|---|---|---|
| ■ | SYSTEM BASED ON THE DEPARTMENT OF DEFENSE (DOD5220.22-M) | 3 | FIXED VALUE 1 TO FIXED VALUE 2 TO RANDOM NUMBER TO INSPECTION |
| ☐ | SYSTEM BASED ON NCSC (NCSC-TG-025) | 3 | FIXED VALUE 1 TO FIXED VALUE 2 TO FIXED VALUE 3 |
| ☐ | SYSTEM BASED ON THE UNITED STATES AIR FORCE (AFSSI5020,AFI33-202) | 7 | FIXED VALUE 1 ....FIXED VALUE 7 TO INSPECTION |
| ☐ | GUTTMANN RECOMMENDED SYSTEM | 35 | RANDOM NUMBER FOUR TIMES TO FIXED VALUE 1....FIXED VALUE 27 TO RANDOM NUMBER FOUR TIMES |

STORAGE CONTROLLER AND DATA ERASING METHOD FOR STORAGE DEVICE

CROSS REFERENCES TO RELATED APPLICATIONS

This application is a continuation application of U.S. application Ser. No. 12/987,808, filed Jan. 10, 2011, which, in turn, is a continuation of U.S. application Ser. No. 12/270,893, filed Nov. 14, 2008 (now U.S. Pat. No. 7,873,870), and which application relates to and claims priority from Japanese Patent Application No. 2008-240316, filed on Sep. 16, 2008, the entire disclosures of which are incorporated herein by reference.

BACKGROUND OF THE INVENTION

1. Field of the Invention

The present invention relates to a storage controller and a data erasing method for a storage device.

2. Description of the Related Art

For instance, a host computer (refer it to as a "host", hereinafter) such as a server computer or a main frame computer manages data by using a storage controller. The storage controller is also called RAID (Redundant Array of Inexpensive Disks) system and can provide a redundant storage area to the host.

Since the data to be managed is increased year by year, the capacity of the storage is desired to be enlarged. On the other hand, as the capacity of the storage device is more increased, a data erasing time is the longer when the storage device is discarded or replaced by a new storage device. Therefore, maneuverability for a user is deteriorated. For instance, a superannuated storage device or a storage device in which errors arise frequently is replaced by a new storage device and discarded. Otherwise, a storage device having a small storage capacity may be sometimes replaced by a storage device having a large storage capacity.

The data stored in the storage device to be discarded or exchanged needs to be erased not to be read by other persons from the viewpoint of security. JP-A-2003-345526 discloses a method for erasing the data of a storage device or writing data of bit 0 in all storage areas by using a format command.

SUMMARY OF THE INVENTION

A data sequence of bit 0 or a data sequence of data 1 or random numbers are repeatedly written in the storage device so that the data stored in the storage device can be erased until the data cannot be read. However, as the capacity of the storage device is more increased, a time necessary for erasing the data is the longer, the maneuverability for users is deteriorated.

Further, in the existing technique, since a state of the progress of an erasing operation of the data is not managed, when a write error occurs during the erasing operation of the data, the data is hardly continuously erased. Accordingly, the data erasing operation needs to be recommenced from the first, the data needs to be discarded or reused under a state that the data remains incomplete, or the storage device needs to be physically broken.

The present invention is devised by considering the above-described problems and it is an object of the present invention to provide a storage controller and a data erasing method for a storage device that manage a state of the progress of a data erasing process or a data shredding process and can re-execute the data erasing process of an incomplete storage area where data cannot be erased due to an error.

It is another object of the present invention to provide a storage controller and a data erasing method in which a data erasing process is carried out in an initial size until an error arises, and the data erasing process is carried out again in a small size after the error arises so that the data erasing process can be carried out in a relatively short time and a range of data to be erased can be increased.

Other objects will become apparent from the description of following embodiments.

In order to solve the above-described problems, a storage controller according to the present invention concerns a storage controller that allows a storage device to input and output data. The storage controller comprise: a data size setting part that sets the size of erasing data used for erasing data stored in the storage areas of the storage device; a data erasing part that carries out a data erasing process for erasing the data stored in the storage areas by writing the erasing data whose size is set in the storage areas; a progress state managing part that manages a state of the progress of the data erasing process; and an error detecting part that detects and manages an error related to the data erasing process. The data erasing part detects a storage area of the storage areas where the data erasing process is unfinished in accordance with the state of the progress managed by the progress state managing part and the error detected by the error detecting part and re-executes the data erasing process of the incomplete storage area.

When the error is detected by the error detecting part, the data size setting part can set the size of the erasing data to a size smaller than an initial size, and the data erasing part can use the erasing data whose size is set to the size smaller than the initial size to carry out again the data erasing process of the incomplete storage area.

The data size setting part can set the size of the erasing data to a size selected among values of three stages or more from an initial value to a minimum value.

Before the data erasing part carries out the data erasing process, the data erasing part can previously form the erasing data of the size set by the data size setting part to store the erasing data of the size in a storing part.

After the data erasing part carries out the data erasing process of all the storage areas by using the erasing data of the initial size, the data erasing part can carry out again the data erasing process of the incomplete storage area by using the erasing data of the size smaller than the initial value.

The data erasing part can repeatedly re-execute the data erasing process by reducing the size of the erasing data from the initial value to the minimum value until the data erasing process of the incomplete storage area is completed after the data erasing part carries out the data erasing process of all the storage areas by using the erasing data of the initial size.

When the error is detected, the data erasing part repeatedly re-executes the data erasing process by reducing the size of the erasing data from the initial value to the minimum value until the data erasing process of an area where the error is detected is completed, and after the data erasing process of the area where the error is detected is completed, the data erasing part can carry out the data erasing process of the incomplete storage area of the storage areas by using the erasing data of the initial size.

When the error is detected, the data erasing part repeatedly re-executes the data erasing process until the data erasing process of an area where the error is detected is completed by reducing the size of the data erasing data step by step within a range of the initial value to the minimum value, and after the data erasing process of the area where the error is detected is completed, the data erasing part can carry out the data erasing process of the incomplete storage area of the storage areas by using the erasing data of a finally set size.

The data size setting part can reduce the size of the erasing data stepwise within a designated range.

The data size setting part can reduce stepwise the size of the erasing data ¼ times at a time from the initial value.

The data erasing part can re-execute the data erasing process of the incomplete storage area designated number of times.

The data erasing part can carry out the data erasing process by a designated method of a plurality of previously prepared methods.

The progress state managing part can partition the storage areas at intervals of the size of the erasing data to manage whether or not the data erasing process is completed.

At least apart of respective parts or steps of the present invention may be sometimes formed as a computer program. This computer program may be fixed to a recording medium and circulated or distributed through a network.

BRIEF DESCRIPTION OF THE DRAWINGS

FIG. 6 is an explanatory view showing a block size management table.

FIG. 12 is an example of a screen when the setting of the shredding parameters is started.

FIG. 13 is an example of a screen that sets the shredding parameters.

DESCRIPTION OF THE PREFERRED EMBODIMENTS

Figure 1:
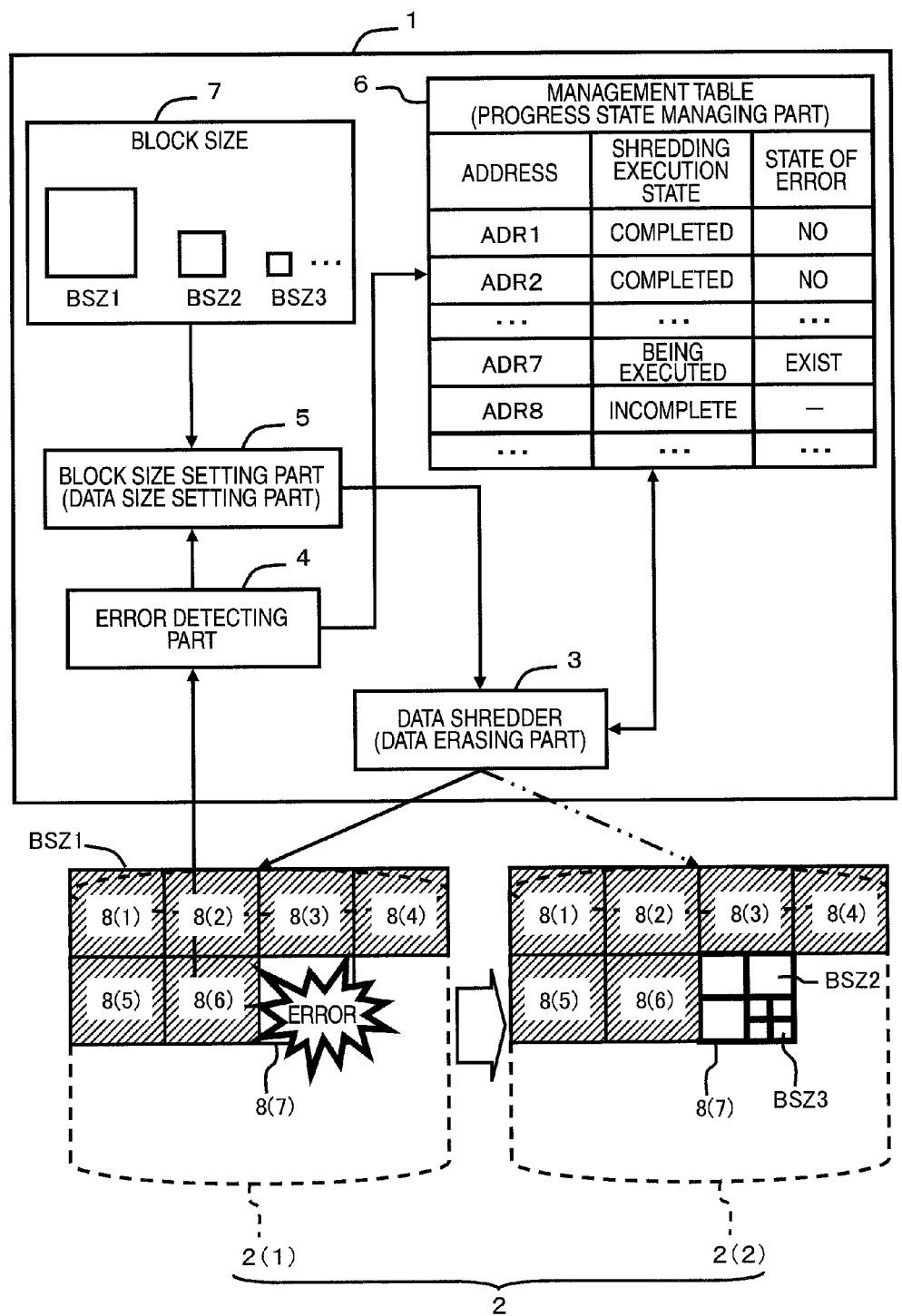
FIG. 1 is an explanatory view that simplifies and shows the concept of the present invention.

Now, referring to the drawings, an embodiment of the present invention will be described below. Initially, the concept of the present invention will be described, and then, a specific embodiment will be described. FIG. 1 is an explanatory view that schematically shows the concept of the present invention. As described below, in this embodiment, the state of the progress of a shredding process, that is, an erasing process is managed and a block size is changed to carry out the shredding process. In this embodiment, for instance, the shredding process is carried out with a large block size as much as possible. When an error arises, the block size is changed to a small block size, and the shredding process is carried out again in a position where the error arises.

A storage system is a system including a controller 1 as a "storage controller" and a disk dive 2 as a "storage device". The controller 1 includes a data shredder 3, an error detecting part 4, a block size setting part 5, a management table 6 and a table 7 that stores a plurality of block sizes.

The data shredder 3 as a "data erasing part" writes prescribed shredding data in the disk drive 2 prescribed number of times on the basis of a preset algorithm to erase data stored in the disk drive 2. A data erasing process is called a shredding process and erasing data is called shredding data, hereinafter.

The error detecting part 4 detects, when a write error of the shredding data arises during the shredding process, the write error. The detected error is stored in the management table 6.

The block size setting part 5 as "a data size setting part" sets the size of the shredding data. As a block size, as shown in the table 7, a plurality of stages such as BSZ1, BSZ2, BSZ3 . . . are prepared. Every time the size changes by one stage, the block size changes to a size ¼ times as large as an original size.

The management table 6 corresponds to a "progress state managing part". The management table 6 manages the state of the progress showing, for instance, to which part of storage areas of the disk drive 2 the shredding process is finished. The management table 6 manages, for instance, an address showing an area in the disk drive 2, a state of the shredding process and a state of the error by allowing them to correspond mutually. The address in the management table 6 is set in accordance with the block size to be used. As shown in a below-described embodiment, the error arising during writing the shredding data may be managed in another table.

The disk drive 2 is configured as a rewritable non-volatile storage device such as a hard disk drive or a flash memory device. The disk drive 2(1) depicted in the left side of FIG. 1 shows a state that the shredding process is first carried out. The disk drive 2(2) depicted in the right side of FIG. 1 shows a state that the shredding process is carried out again in a part where the shredding process fails to be executed due to the error.

In this embodiment, for the convenience of explanation, a maximum block size BSZ1 is set to the data shredder 3 as an initial size. The management table 6 manages the storage areas of the disk drive 2 in units of the block size BSZ1. The data shredder 3 writes the shredding data of the maximum size BSZ1 in order from the first address of storage areas.

Here, it is assumed that the shredding data is normally written in first to sixth areas 8(1) to 8(6), however, in a seventh area 8(7), the shredding data fails to be written.

The block size BSZ2 of a next stage is set to the data shredder 3. The data shredder 3 prepares the shredding data meeting the block size BSZ2 to rewrite the shredding data in the part 8(7) where the error occurs. To rewrite the shredding data in the part where the error occurs is called a retry of the shredding process.

Since the block size BSZ2 is ¼ times as large as the block size BSZ1, the range of the write error can be decreased. Further, when a new write error occurs, the block size BSZ3 of a further next stage is set to the data shredder 3. The block size BSZ3 is ¼ times as large as the block size BSZ2. The data shredder 3 prepares the shredding data meeting the block size BSZ3 to write the shredding data in a part where the error occurs. A data shredding method is not limited to the above-described method. As shown in a below-described embodiment, a plurality of methods can be executed.

As described above, in this embodiment, since the shredding process can be carried out by using the relatively large block size BSZ1, the number of times of writing the shredding data in the disk drive 2 can be reduced and a time required for the shredding process can be shortened.

In this embodiment, the state of the progress of the shredding process or the state of the occurrence of the write error is managed. Accordingly, even when the write error of the shredding data occurs, the shredding process can be continuously carried out in remaining areas or can be retried in the part where the error occurs, so that maneuverability for a user is improved.

In this embodiment, when the error arises during writing the shredding data, the block size is diminished to retry the shredding process in the part where the error occurs. Accordingly, a range in which the shredding process is carried out can be increased and the reliability of the data shredding process can be improved. Now, the embodiment of the present invention will be described below in detail.

[First Embodiment]

Figure 2:
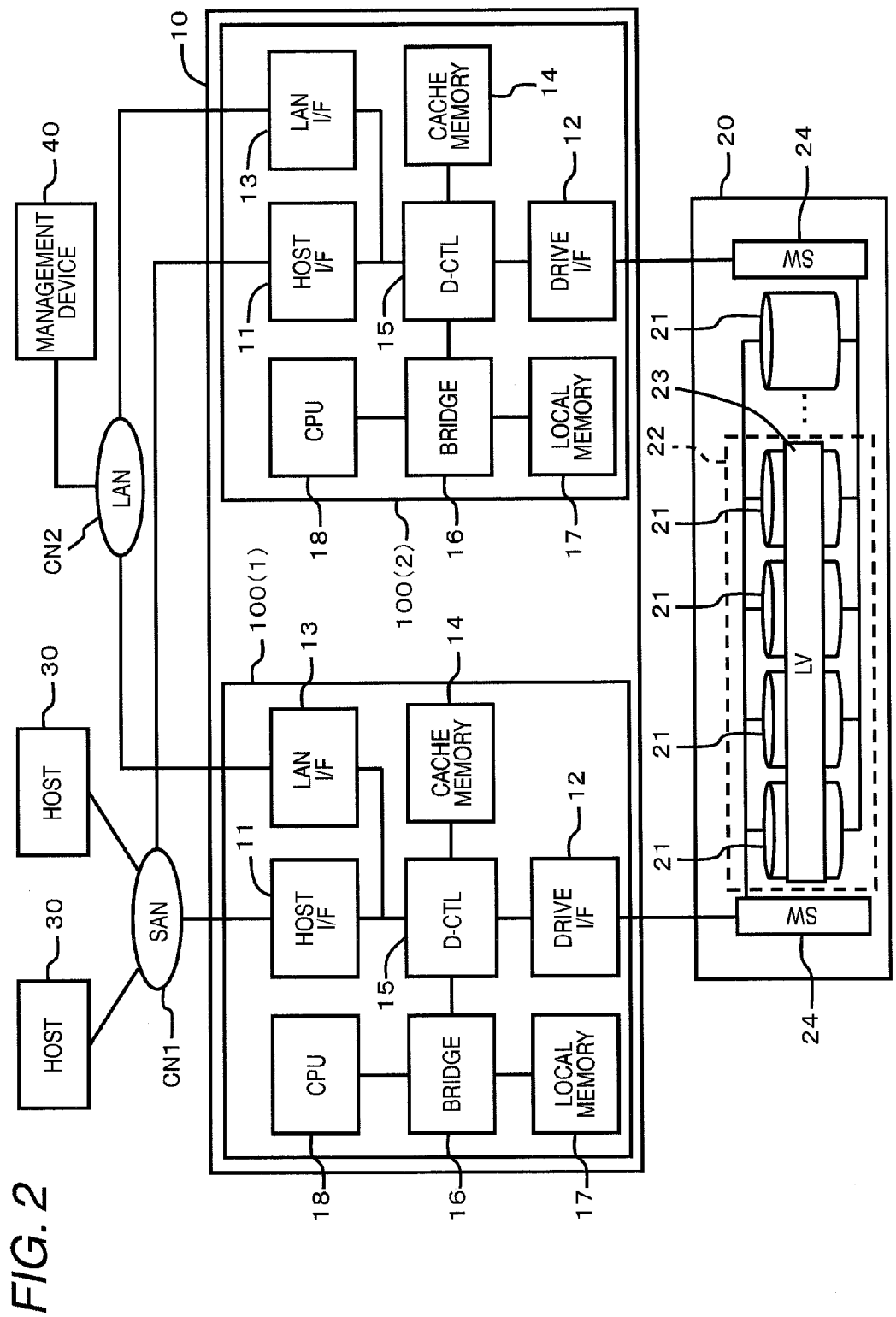
FIG. 2 is a diagram showing an entire structure of a first embodiment of a storage system to which the present invention is applied.

FIG. 2 is an explanatory view showing an entire structure of the storage system according to this embodiment. The storage system includes, for instance, a basic chassis 10, an increased chassis 20, a host 30 and a management device 40. The host 30 is connected to the basic chassis 10 by a communication network CN1 such as FC-SAN (Fibre Channel-Storage Area Network) or IP-SAN (Internet Protocol-SAN). The management device 40 is connected to the basic chassis 10 by a communication network CN2 such as LAN (local Area Network).

A corresponding relation of FIG. 2 to FIG. 1 will be described beforehand. A controller 100 corresponds to the controller 1 shown in FIG. 1. A disk drive 21 corresponds to the disk drive 2 in FIG. 1. A CPU 18 in the basic chassis 10 reads a prescribed program and executes the program so that the functions of the data shredder 3, the error detecting part 4 and block size setting part 5 described in FIG. 1 are realized.

Other structures than the structure of the basic chassis 10 will be described, and then, the structure of the basic chassis 10 will be described. The host 30 is a computer, for instance, a server computer, a work station, a main frame computer, etc. The host 30 uses a logical volume (in the drawing, abbreviated as "LV") 23 through the basic chassis 10.

The management device 40 is configured as a computer such as a personal computer or a portable information terminal. The management device 40 includes, for instance, a storage management part 41 and a web browser 42 (see FIG. 3). The storage management part 41 serves to give an instruction to the basic chassis 10 and manage the basic chassis.

The increased chassis 20 includes a plurality of disk drives 21. In this embodiment, the disk drive is not limited to a disk shaped recording medium. For instance, various kinds of devices can be employed that can read and write data, for instance, a hard disk drive, a semiconductor memory device, an optical disk device, a magneto-optical disk device, a magnetic tape device, a flexible disk device, etc. When the hard disk drive is used as a storage device, for instance, an FC (Fibre Channel) disk, an SCSI (Small Computer System Interface) disk, an SATA disk, an ATA (AT Attachment) disk, an SAS (Serial Attached SCSI) disk, etc. can be used.

When the semiconductor memory device is used as the storage device, various kinds of memory devices can be employed such as a flash memory, an FeRAM (Ferroelectric Random Access Memory), an MRAM (Magnetoresistive Random Access Memory), a phase change memory (Ovonic Unified Memory), an RRAM (Resistance RAM), etc.

The plurality of disk drives 21 are grouped so that a RAID group 22 can be formed. In a physical storage area provided in the RAID group 22, the logical volume 23 as a logical storage area can be provided. The increased chassis 20 is connected to the controller 100 in the basic chassis 10 through a switch circuit 24.

The basic chassis 10 includes a plurality of controllers 100 (1) and 100(2). These controllers 100(1) and 100(2) realize a redundant structure. The controllers 100(1) and 100(2) are referred to as a controller 100 without discriminating them hereinafter.

The controller 100 includes, for instance, a host interface (in the drawing, an interface is abbreviated as I/F) 11, a drive interface 12, a LAN interface 13, a cache memory 14, a data transfer control circuit 15 (in the drawing, D-CTL 15), a bridge 16, a local memory 17 and a CPU 18.

The host interface 11 is a circuit for communicating with the host 30. The drive interface 12 as a "communication interface for a storage device" is a circuit for communicating with the disk drive 21. The LAN interface 13 as a "communication interface for a management device" is a circuit for communicating with the management device 40. The host interface 11 may be called a host communication interface for communicating with, for instance, a host device (the host 30) or an external device (an external storage controller 10E in FIG. 28).

In the cache memory 14, data received from the host 30, data read from the disk drive 21, the shredding data or the like are stored. The shredding data corresponds to "erasing data" and used for the shredding process.

The data transfer control circuit 15 is a circuit for controlling the input and output of the data to the cache memory 14. The CPU 18 and the local memory 17 are connected to the data transfer control circuit 15 through the bus bridge 16.

In the local memory 17, a computer program for carrying out a below-described data shredding process or control information is stored. The CPU 18 reads the computer program from the local memory 17 and executes the shredding process.

Figure 3:
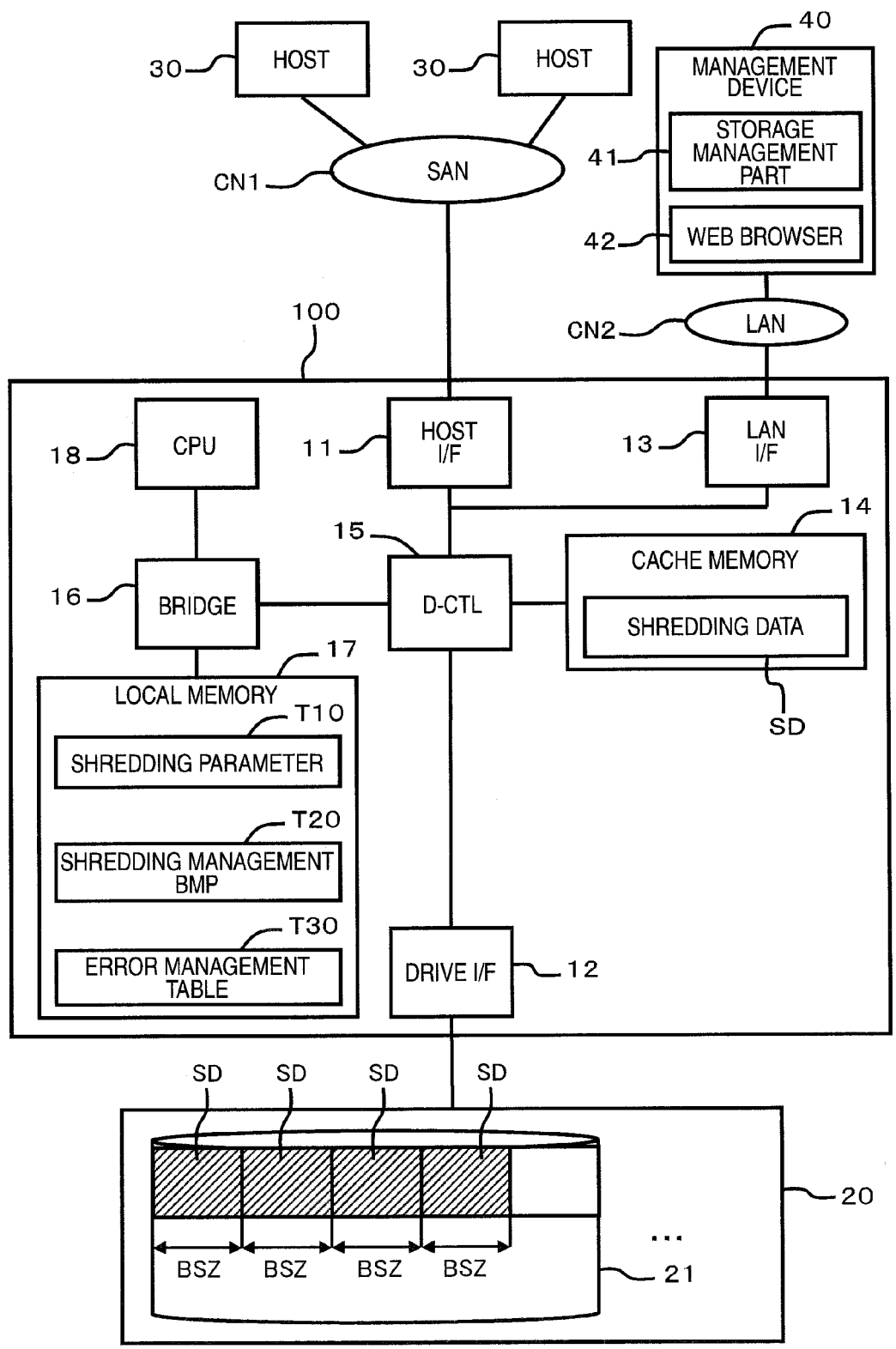
FIG. 3 is a diagram showing in detail a controller or the like of the storage system shown in FIG. 2.

FIG. 3 is an explanatory view schematically showing the structure of the controller 100 or the like. In the local memory 17, a below-described shredding parameter T10, a shredding management bit map T20 and an error management table T30 are stored. In the cache memory 14, the shredding data is stored.

Figure 4:
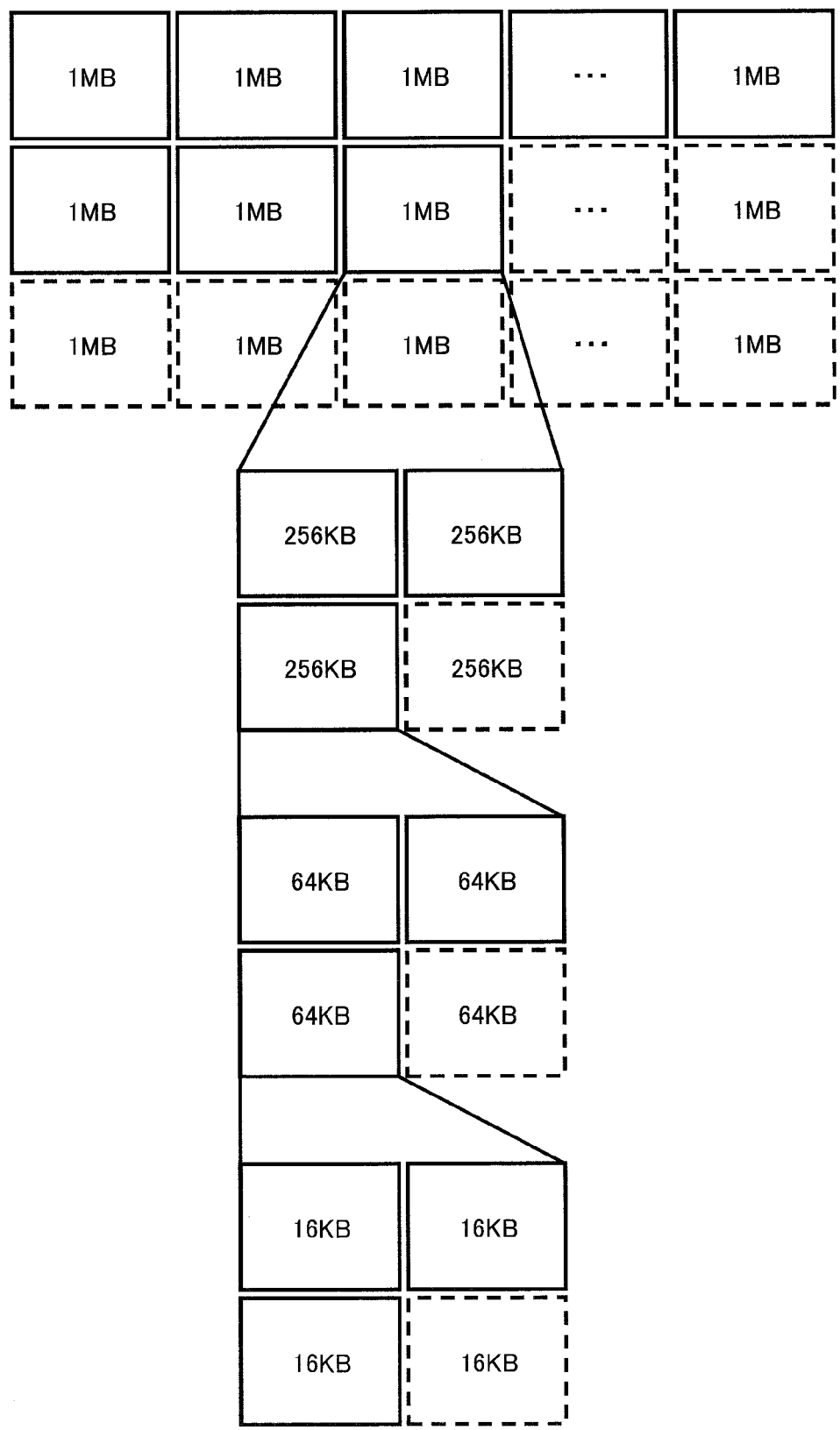
FIG. 4 is an explanatory view showing the relation of a plurality of block sizes.

FIG. 4 is an explanatory view for simply showing a part of the block size used in the shredding process. As the block size BSZ, values that are decreased step by step to values ¼ times as small as the prior values are employed, such as 1 MB, 256 KB, 64 KB, 4 KB, 1 KB. The maximum value of the block size BSZ is, for instance, 1 GB, and a minimum value is, for instance, 1 KB (see FIG. 14).

When the shredding process is carried out, the controller 100 manages the storage area of the disk drive 21 by the set block size BSZ. The controller 100 sequentially writes the shredding data SD of the block size BSZ in order from a first address to a final address of the storage area of the disk drive 21.

When an error occurs during the writing operation of the shredding data, the block size BSZ is reset to a value lower by one stage than that of the initial block size. The controller 100 retries to carry out the shredding process in a part where the error arises by a smaller block size BSZ.

Figure 5:
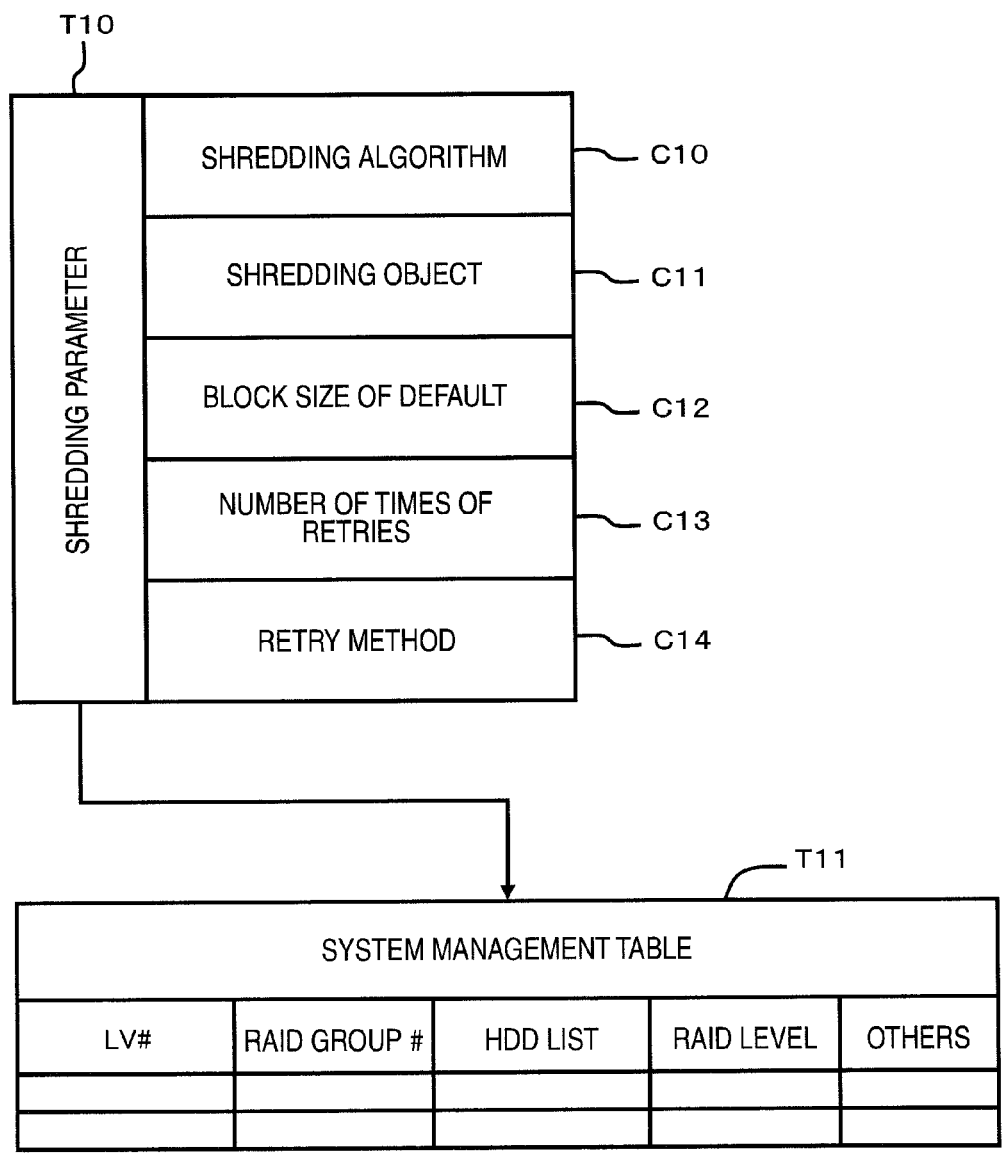
FIG. 5 is an explanatory view showing shredding parameters.

FIG. 5 is an explanatory view showing the shredding parameter T10. The shredding parameter T10 is a table for storing various kinds of parameters used in the shredding process. A user sets the shredding parameter T10 by using, for instance, the management device 40.

The shredding parameter T10 includes, for instance, a shredding algorithm C10, a shredding object C11, a block size C12 of default, the number of times of retries C13 and a retry method C14.

In the shredding algorithm C10, information for selecting an algorithm used in the shredding process is set. Any one of the algorithms is selected among a plurality of algorithms such as a system based on the Department of Defense (DoD5220.22-M), a system based on NCSC (NCSC-TG-025), a system based on the United States Air Force (AFSSI5020, AFI33-202), a Guttmann recommended system.

In the shredding object C11, information for specifying an object that carries out the shredding process is set. As the shredding object, for instance, a disk drive unit, a RAID group unit and a logical volume unit may be exemplified. Further, a plurality of logical volumes having mutually relativity may be designated as the shredding object.

In the block size C12 of default, the block size initially used in the shredding process is set. In the number of times of retries C13, the number of times of retries of the shredding process is set. In the retry method C14, is set information for selecting any one of methods among a plurality of previously prepared retry methods. The detail of the plurality of retry methods will be described below.

A system management table T11 is a table for managing information of storage resources in the storage system. The system management table T11 includes items of, for instance, LV#, RAID group #, HDD list, RAID level and others.

"LV#" indicates information for identifying the logical volume 23. "RAID group #" indicates information for identifying an intermediate storage device used for allocating the storage area of the RAID group 22 to the logical volume 23. "HDD list" indicates information for identifying each disk drive 21 belonging to the RAID group 22. "RAID level" indicates information for specifying the RAID level or the RAID configuration of the RAID group. In "others", is set information for specifying, for instance, the total capacity or the space capacity of the RAID group and a host that uses the logical volume.

The shredding object C11 of the shredding parameter T10 is set by referring to the system management table T11.

FIG. 6 shows a table T12 in which the bock sizes that can be used in the shredding process are registered. The system management table T11 and the block size management table T12 are stored in the local memory 17. These tables may be stored, for instance, in the disk drive 21 prepared for storing system information in place of the local memory 17.

The block size management table T12 includes a serial number C15 and a block size C16. In the block size C16, the block sizes of 11 stages in total are set so that the sizes are decreased in order to values ¼ times as small as the prior size within a range from, for instance, 1 GB to 1 KB.

As the block size of default, for instance, 64 MB can be used. The number of times that can be retried is restricted depending on the value of the block size of default. The default block size is a maximum size in a series of shredding processes carried out in a certain shredding object. That is, the shredding process is started by the maximum block size, and when the error arises, the block size is changed to a small block size.

Figure 7:
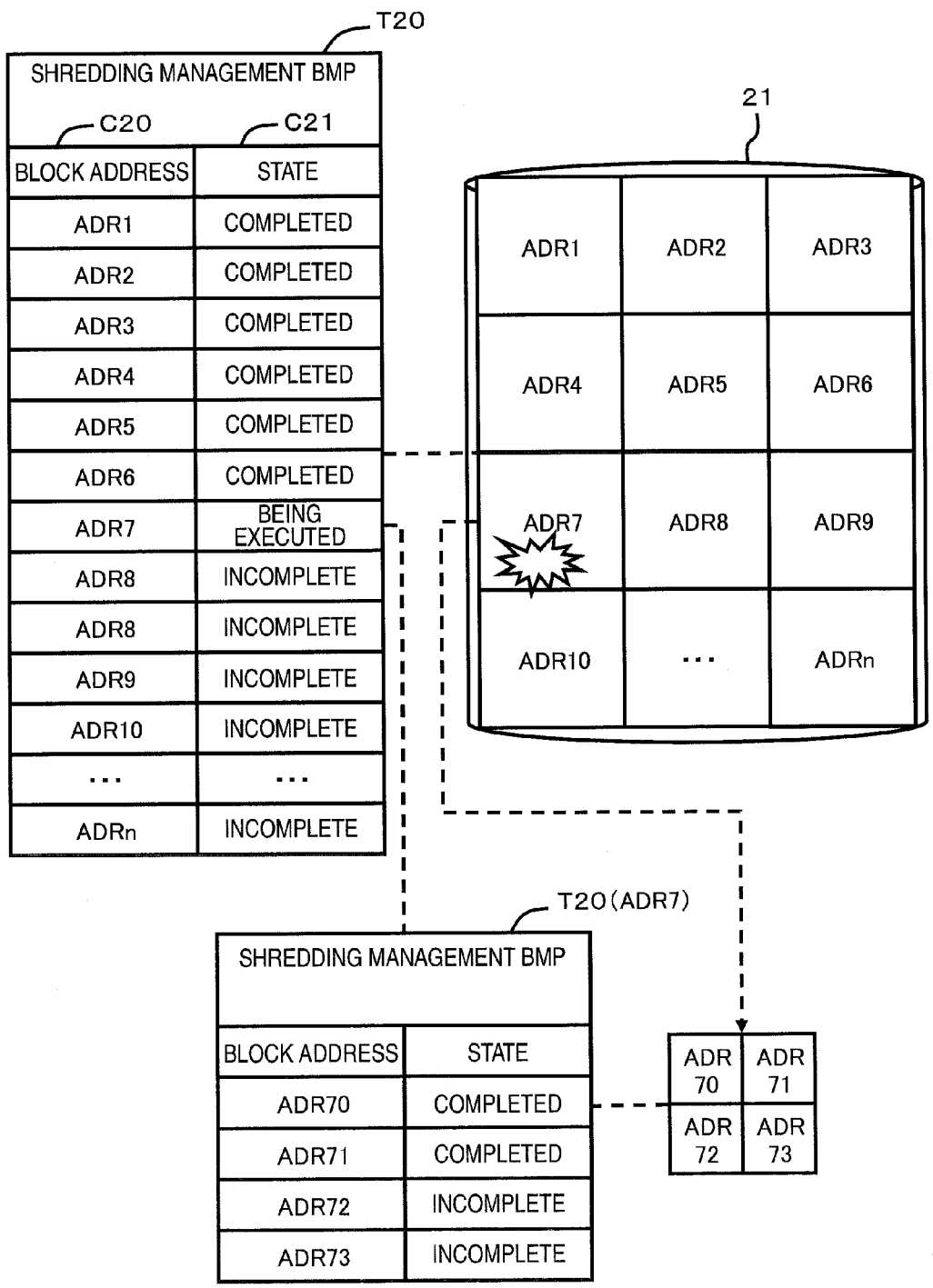
FIG. 7 is an explanatory view showing a bit map for a shredding management.

FIG. 7 is an explanatory view showing a shredding management bit map T20. The shredding management bit map T20 forms the "progress state management part" together with the CPU 18. In a flowchart, the shredding management bit map is abbreviated as a management BMP.

The management bit map T20 manages, for instance, a block address C20 and a state C21. The block address C20 indicates an address for managing the storage area of the shredding object for each block size used in the shredding process. For instance, when 64 MB is set as the block size, in the block address C20, values that increase in 64 MB units are set in order from the first address of the storage area of the shredding object.

The state C21 indicates information showing the state of the shredding process of the block address. In the state C21, any one of, for instance, "completed", "during execution", "incomplete" and "error" is set. The "completed" shows a state that the shredding process of the block address is normally completed. The "during execution" shows that the shredding process of the block address is being executed. The "incomplete" shows that the shredding process of the block address is not carried out yet. The "error" shows a state that the write error of the shredding data occurs during the shredding process of the block address.

For instance, a case that the shredding object is one disk drive 21 will be described below. In the storage area of the disk drive 21, the progress state of the shredding process is managed in block size units used in the shredding process in order from the first address.

Figure 8:
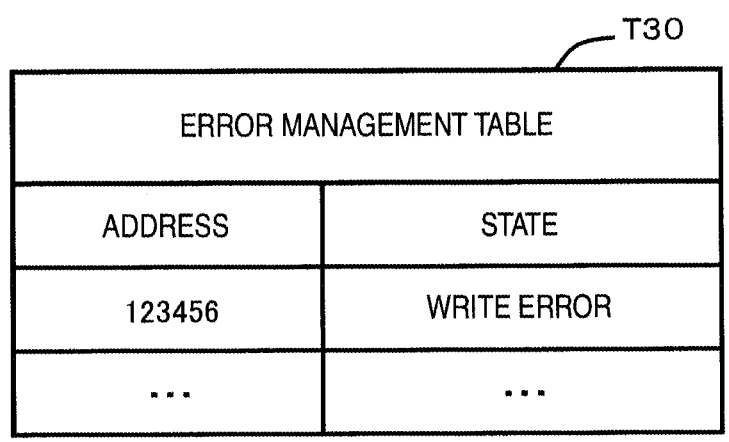
FIG. 8 is an explanatory view showing an error management table.

The shredding processes of the block addresses ADR1 to ADR6 are normally completed, and then, the shredding process of the block address ADR7 is carried out. At this time, in the column of the block address ADR7 in the management bit map T20, "during execution" is set. When the write error occurs during the writing operation of the shredding data in the block address ADR7, the "during execution" is changed to the "error". The contents of the error are recorded in an error management table T30 shown in FIG. 8. The error management table T30 may be combined with the management bit map T20.

When the error is detected in the ADR7, another management bit map T20 (ADR7) is formed in a part (an area of the ADR7) where the error occurs. Another management bit map T20 (the ADR7) divides the part where the error occurs into four of ADR70 to ADR73 and manages them.

In the part where the error occurs, the shredding data is written with a block size (¼ as small as the block size before the error occurs) lower by one stage than the initial block size. When a new error does not occur in the part where the error appears, the shredding data of the ¼ size is written four times to complete the shredding process.

Figure 9:
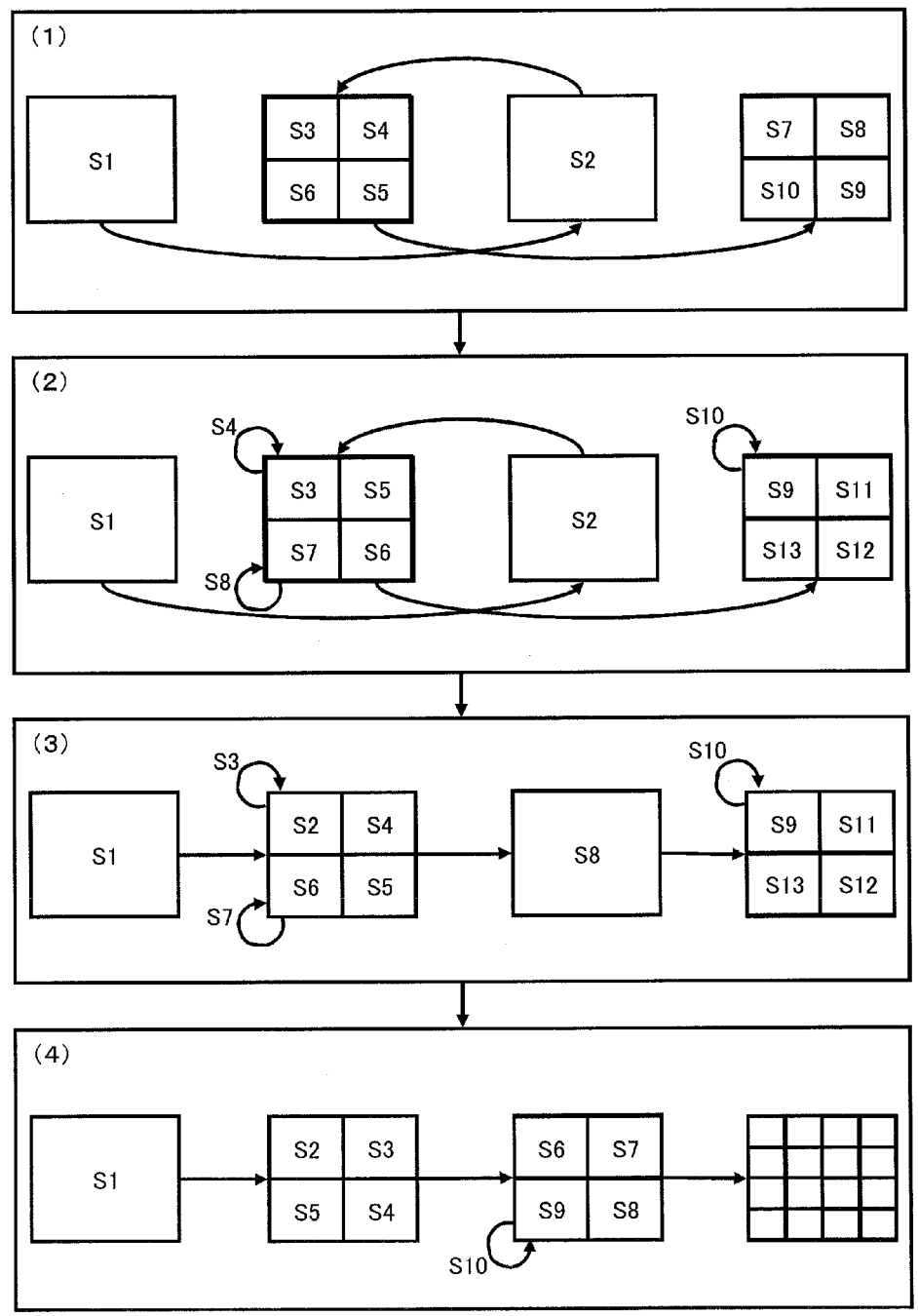
FIG. 9 is an explanatory view showing a retry method of a shredding process.

FIG. 9 is an explanatory view showing schematically a plurality of retry methods. In this embodiment, any one is selected from a total of four systems of a first system to a fourth system. If there is room for time, the plurality of systems may be carried out for the same shredding object at the same time.

In a below-described explanation, areas are called a first area, a second area, a third area and a fourth area in order from the left end of FIG. 9. The area located in the right end is the fourth area. The initial block size is set to BSZ1, the block size smaller by one stage than the first block size is set to BSZ2 and the block size smaller by one stage than the block size BSZ2 is set to BSZ3.

FIG. 9(1) shows a summary of the first system. In the first system, even when the error arises, a retry of the shredding process to the part where the error arises is made afterward to generally carry out the shredding process of the entire part of the shredding object. Then, in the first system, the block size is lowered by one stage to retry to generally carry out the shredding process of all parts where the errors arise.

After the retry of the shredding process of all the parts where the errors arise that are detected in the first shredding process is completed, the block size is further lowered by one stage and the shredding process retries to be carried out to a part where a new error arises that is detected during a first retry. The shredding process retries to be carried out with the block size of a minimum unit hereinafter in the same manner as described above, or the shredding process is repeated until there is no part where the error arises.

Here, the minimum unit means a minimum value of the block sizes usable in the shredding process. For instance, even when the block size can be designated within a range of 1 GB to 1 KB, if an initial value is 1 GB and the number of times of retries is set to 3, in a usable block size, four block sizes of 1 GB, 256 MB, 64 MB and 16 MB are included. Accordingly, in this case, the minimum unit of the block size is 16 MB.

The above-described explanation represents a cycle of one shredding data. For instance, when the shredding data of bit 0 and the shredding data of bit 1 are written two times, the above-described cycle is carried out two times.

In the example shown in FIG. 9(1), after the shredding data of the block size BSZ1 is written in the first area (S1), the object to be processed shifts to the second area. When the write error occurs during the writing process of the shredding data in the second area, the object to be processed shifts to the third area. At this time, the retry to the second area is not carried out. In the third area, the shredding data of the block size BSZ1 is written (S2). The object to be processed shifts to the fourth area. However, the write error of the shredding data is supposed to arise also in the fourth area.

After the shredding process of the first area to the fourth area is completed in a general way, the shredding process retries to be carried out in the parts where the errors arise (the second area and the fourth area). In a retry process, the block size BSZ2 smaller by one stage than the initial block size BSZ1 is employed. To carry out the shredding process again in the part where the error arises may be sometimes referred to as the retry process.

The second area as the part where the first error arises is divided into four sub-areas and managed. In the sub-areas respectively, the shredding data of the block size BSZ2 are respectively written in order (S3 to S6). After the retry process of the second area is finished, the retry process of the fourth area as the part where the next error arises is carried out. The fourth area is also divided into sub-areas corresponding to the size of BSZ2 and managed. In the sub-areas respectively, the shredding data of the block size BSZ2 is respectively written in order (S7 to S10).

Even when a new error (the write error of the shredding data) arises during the first retry process, the retry process of the new error is not carried out until the first retry process is completed in a general way. After the first retry process of the parts where the initially detected errors arise is finished, a second retry process of the part where the new error arises is carried out.

FIG. 9(2) shows a summary of a second system. In the second system, even when the error is detected in the initial shredding process, the retry process is not carried out until the shredding process of the entire area of the shredding object is generally completed as in the first system. The difference between the second system and the first system resides in that in the second system, the retry process of parts where errors arise that are respectively detected in the initial shredding process is carried out until the block size becomes a block size of a minimum unit or the errors are absolutely eliminated.

In the example shown in FIG. 9(2), after the shredding data of the block size BSZ1 is written in the first area (S1), the object to be processed shifts to the second area. However, the write error of the shredding data is supposed to occur in the second area. The retry process of the second area is postponed. The object to be processed shifts to the third area. After the shredding data of the block size BSZ1 is normally written in the third area (S2), the object to be processed shifts to the fourth area. However, the write error of the shredding data is supposed to arise in the fourth area.

After the initial shredding process of the entire part (the first area to the fourth area) of a range as the shredding object is finished, the retry process of parts (the second area, the fourth area) where the errors arise is started.

The retry process of the parts where initially detected errors arise is carried out until the block size becomes a block size of a minimum unit. When the shredding data is normally written to cancel the error before the retry process using the block size of the minimum unit is started, the retry process of the part where the error arises is finished at that time.

The second area is divided on the basis of the block size BSZ2 smaller by one stage than the block size BSZ1 and managed. In sub-areas respectively, the shredding data of the block size BSZ2 is written in order (S3, S5 to S7). While the shredding data of the block size BSZ2 is written in a first sub-area (an upper left area) in the second area, an error is supposed to arise (S3). The first sub-area is further divided into four parts and managed and the shredding data of the block size BSZ3 smaller by one stage than the block size BSZ2 is written in the first sub-area (S4).

Though an illustration is omitted, if an error further arises during the execution of S4, a part where the error arises is further divided into four parts and the retry process is carried out by using the size BSZ3 smaller by one stage than the size BSZ2.

When an error arises during the retry process (S7) of a fourth sub-area (a lower left area of the second area), the retry process of a part where the error arises by using the block size BSZ3 smaller than the block size BSZ2 is carried out (S8) as described above.

After the retry process of the parts where the first errors arise is carried out in such a way, the object to be processed shifts to the fourth area as a part where a next error arises. Then, the retry process is carried out as much as possible in the same way as described above (S9 to S13).

As described above, after the shredding process using the largest initial size is carried out throughout the entire part of the range of the shredding object, the retry process of the parts where the errors respectively arise is carried out as much as possible. When the error is detected after the process shifts to the retry process, the retry process of the detected error is immediately carried out.

FIG. 9(3) shows a summary of the third system. In the third system, when an error arises during the first shredding process, the retry process of a part where the error arises is immediately executed. The retry process of the part where the error arises is carried out until the retry process using the block size of the minimum unit is completed or the error is cancelled. After the retry process of the part where the error occurs is completed, the block size is returned to the initial size to continuously carry out the initial shredding process of the next area.

In the example shown in FIG. 9(3), after the shredding data of the initial size BSZ1 is written in the first area (S1), the shredding data is written in the second area. However, the write error is supposed to arise in the second area. The retry process of a part (the second area) where the error arises is immediately started and carried out as much as possible (S2 to S7). That is, the shredding data is written until the retry process of the second area with the block size of the minimum unit is carried out or all errors are cancelled.

After the retry process to the second area is completed, the object to be processed shifts to the third area. At the same time, the block size is returned to the initial size BSZ1. In the third area, the shredding data of the block size BSZ1 is normally written (S8).

When an error arises during the writing process of the shredding data to the fourth area, the retry process of the fourth area is immediately started and carried out as much as possible (S9 to S13) as described in the second area. To carry out the retry process as much as possible means to carry out the process until the retry process using the block size of the minimum unit is finished or the errors are cancelled.

FIG. 9(4) shows a summary of the fourth system. In the fourth system, when an error arises during the first shredding process, the retry process of a part where the error arises is immediately executed as in the third system. In the third system, after the retry process of the part where the error arises is completed, the size of the shredding data is returned to the initial size BSZ1, however, in the fourth system, a finally used block size is kept used to carry out the shredding process of other areas.

In the example shown in FIG. 9(4), after the shredding data of the initial size BSZ1 is written in the first area (S1), the object to be processed shifts to the second area. However, the write error is supposed to arise in the second area. The block size is immediately changed to the block size BSZ2 smaller by one stage than the initial size BSZ1.

The retry process of the second area is carried out by using the block size BSZ2 as much as possible (S2 to S5). Here, the shredding data of the block size BSZ2 is supposed to be normally written in all of sub-areas respectively formed by dividing the second area into four parts.

The object to be processed shifts to the third area. As the block size, the block size BSZ2 used in the retry process of the second area is used as it is. The shredding data of the block size BSZ2 is written respectively in sub-areas of the third area (S6 to S9). When a new error arises in the third sub-area shown in a lower left part of the third area, the block size is changed to the block size BSZ3 smaller by one stage than the block size BSZ2 (S10).

When the retry process of the third area is carried out as much as possible (S6 to S10), the object to be processed shifts to the fourth area. A finally set block size BSZ3 is used as it is. The fourth area is divided into 16 parts and managed and the shredding data of the size BSZ3 is written respectively in divided sections.

As described above, in this embodiment, any one of the first system to the fourth system is selected to carry out the shredding process. In the first system shown in FIG. 9(1), the shredding data of the large initial size BSZ1 is used to generally process the entire part of the shredding object, and then, the retry process of the part where the error arises is carried out. Namely, in the first system, since the block size is not lowered as much as possible to carry out the process, the number of writings of the shredding data can be reduced and the shredding process can be finished in an early stage.

In the first system, the shredding data can be written in a wide range of the shredding object in a relatively short time from the start of the shredding process. Accordingly, even when the disk drive 21 is pulled out from the increased chassis 20 during the shredding process, a quantity of data that can be read from the disk drive 21 can be reduced to improve a security.

Also in the second system shown in FIG. 9(2), the initial size BSZ1 is used as long as possible, so that the number of writings can be reduced and a processing time can be shortened.

In the third system shown in FIG. 9(3), the retry process of the part where the error arises is executed as much as possible, and then, the block size is returned to the initial size BSZ1 to write the shredding data in an unprocessed area. Accordingly, in the third system, the data can be steadily erased in order from the first address of the shredding object.

In the fourth system shown in FIG. 9(4), since the block size that is made to be small once does not need to be returned to the initial size, this method is relatively simple. When the area of the shredding object is relatively small and a cause of the error is hidden backward the area of the shredding object, the fourth system effectively functions, because, in that case, the shredding data can be written in most of the area of the shredding object with the large block size. On the contrary, when the area of the shredding object is relatively wide and the cause of the error lies concealed forward, in the fourth system, a time required for completing the shredding process is long.

A user can determine which of the first system to the fourth system is to be adopted. Otherwise, as a recommended system, for instance, the first system or the second system may be set to an initial value.

Figure 10:
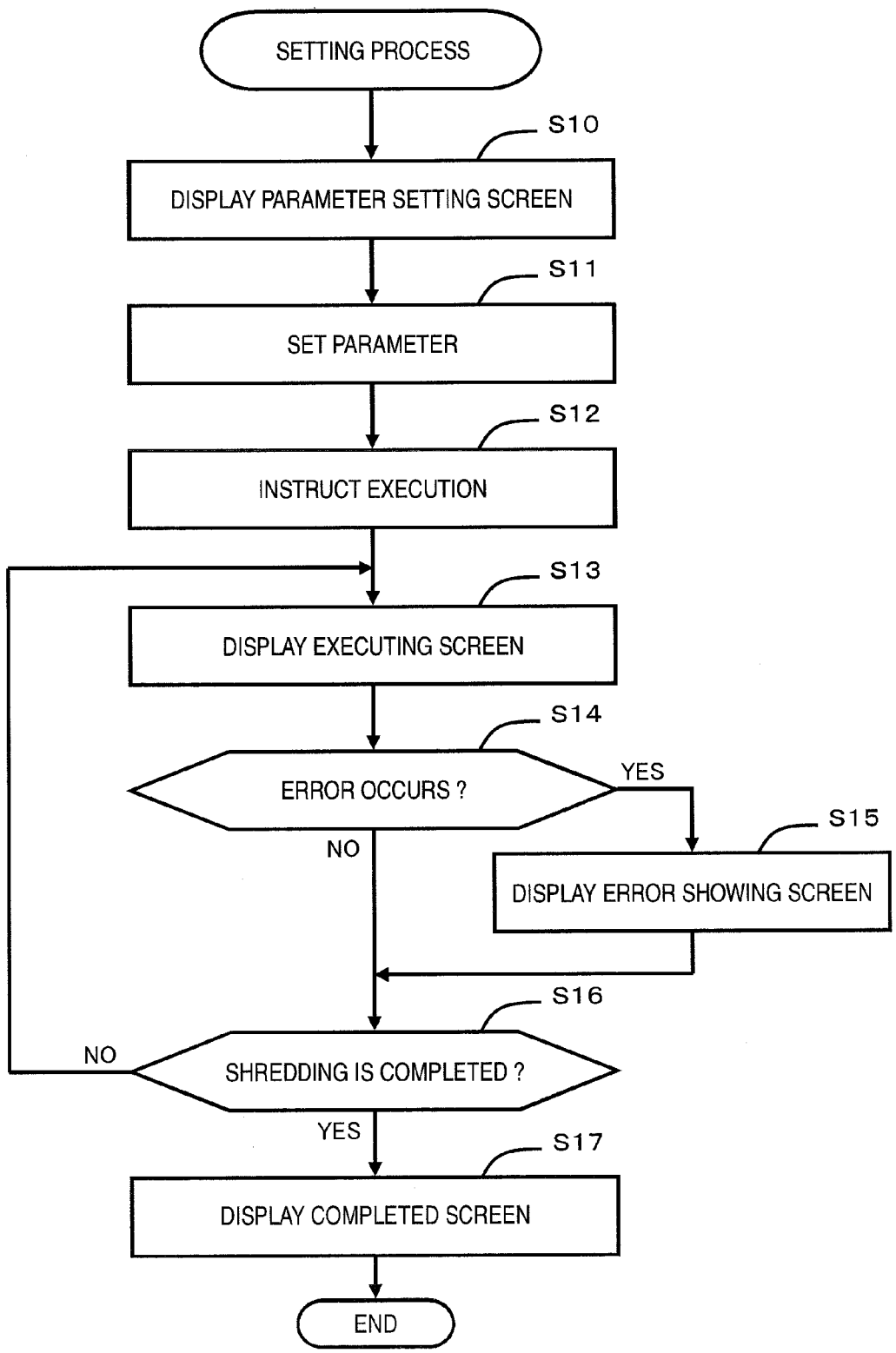
FIG. 10 is a flowchart for setting the shredding process.

FIG. 10 is a process that the user sets the parameters for the shredding process to the controller 100 through the management device 40. This process is carried out by allowing the management device 40 to suitably communicate with the controller 100. Flowcharts shown below respectively represent the summaries of processes, which may be sometimes different from actual computer programs. What is called a person with ordinary skill in the art can change, replace, add or delete illustrated steps.

In explaining FIG. 10, examples of screens shown in FIGS. 12 to 18 will be suitably referred to. Initially, a menu screen G10 as illustrated in FIG. 12 is displayed (S10) in the management device 40. Thus, FIG. 12 is referred to. In the menu screen G10, an item selecting part P10 and a shredding part P11 are displayed. The user operates a shredding setting button B10 in a shredding setting part P12 so that the user can move to screen G20 and G21 for setting the shredding parameters (see FIG. 13 and FIG. 14).

The parameter setting screen G20 shown in FIG. 13 includes a setting part P20, a list selecting part P21 and an algorithm selecting part P22. The setting part P20 serves to set the shredding unit. For instance, any one of the disk drive unit, the RAID group unit and the logical volume unit can be selected as the shredding object.

The list selecting part P21 serves to display the list of the set shredding units to select the shredding object. In the case of the disk drive unit, all disk drives 21 that can be selected as the objects of the shredding processes are displayed in the form of the list. In the list, a drive number, a storage capacity, a RAID group number to which the disk drive belongs and a RAID level are displayed.

The algorithm selecting part P22 serves to allow the user to select any one from a plurality of previously prepared shredding algorithms. In the algorithm selecting part P22, the summaries of the algorithms (number of times of writings or patterns to be written, etc.) can be respectively displayed.

Figure 14:
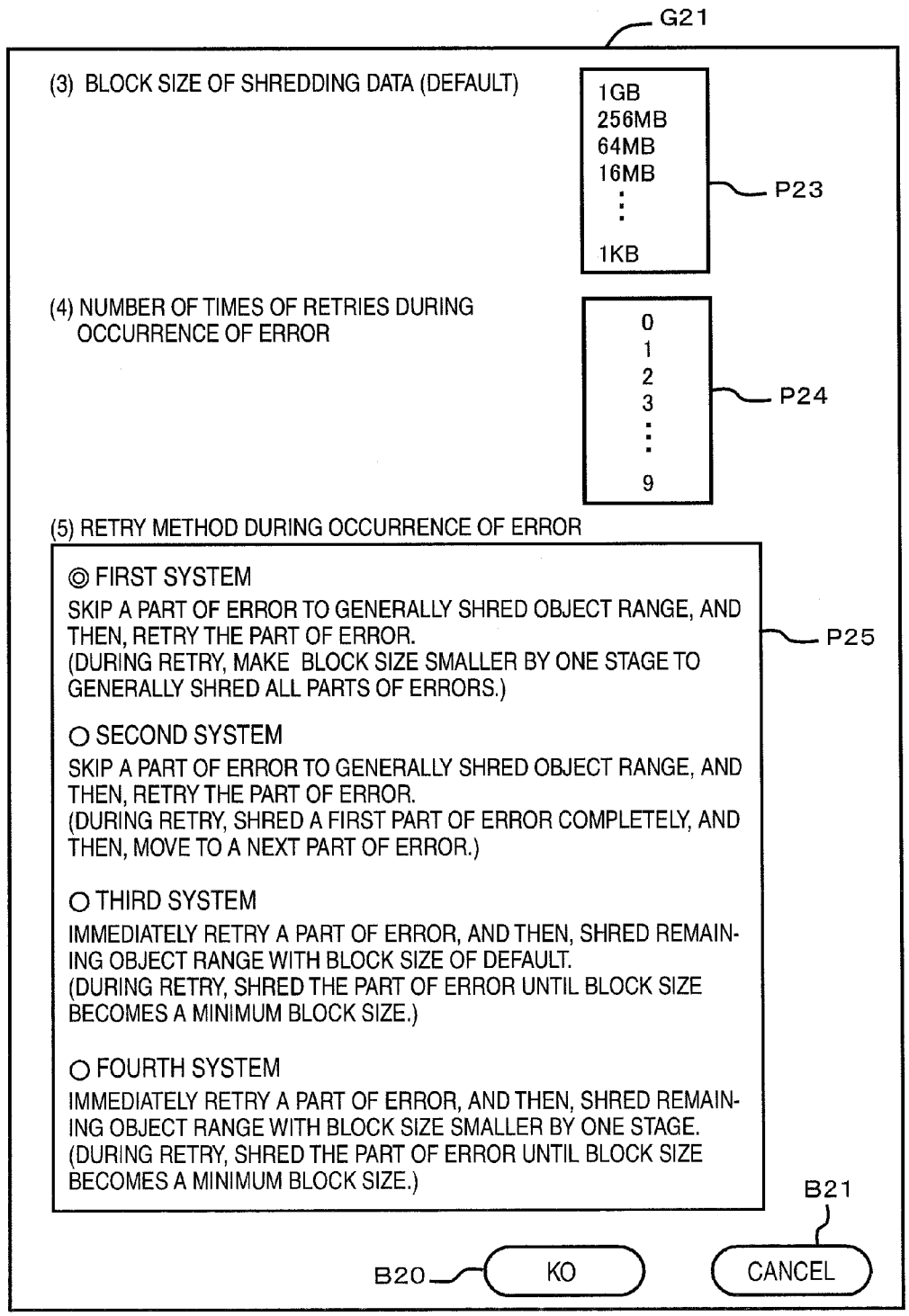
FIG. 14 is an example of a screen for setting the shredding parameters that is continued to the screen shown in FIG. 13.

In FIG. 14, the screen G21 continuing to the screen G20 illustrated in FIG. 13 is shown. The screen G21 includes a block size selecting part P23, a retry number setting part P24, a retry method selecting part P25, an OK button B20 and a cancel button B21.

The block size selecting part P23 serves to select the block size of default used in the shredding process. The user selects a value of the initial size BSZ1, for instance, within a range where the block size is reduced to a value ¼ times as small as a prior block size at a time from 1 GB to 1 KB.

The retry number setting part P24 sets the upper limit value of the number of times of retries. The number of times of retries means the number of times of carrying out the retry processes. The retry method selecting part P25 serves to allow the user to select any one of the retry methods from the first system to the fourth system.

The user sets the parameters respectively shown in the screens G20 and G21 and operates the OK button B20. When the user cancels the contents of the setting, the user operates the cancel button B21.

Figure 15:
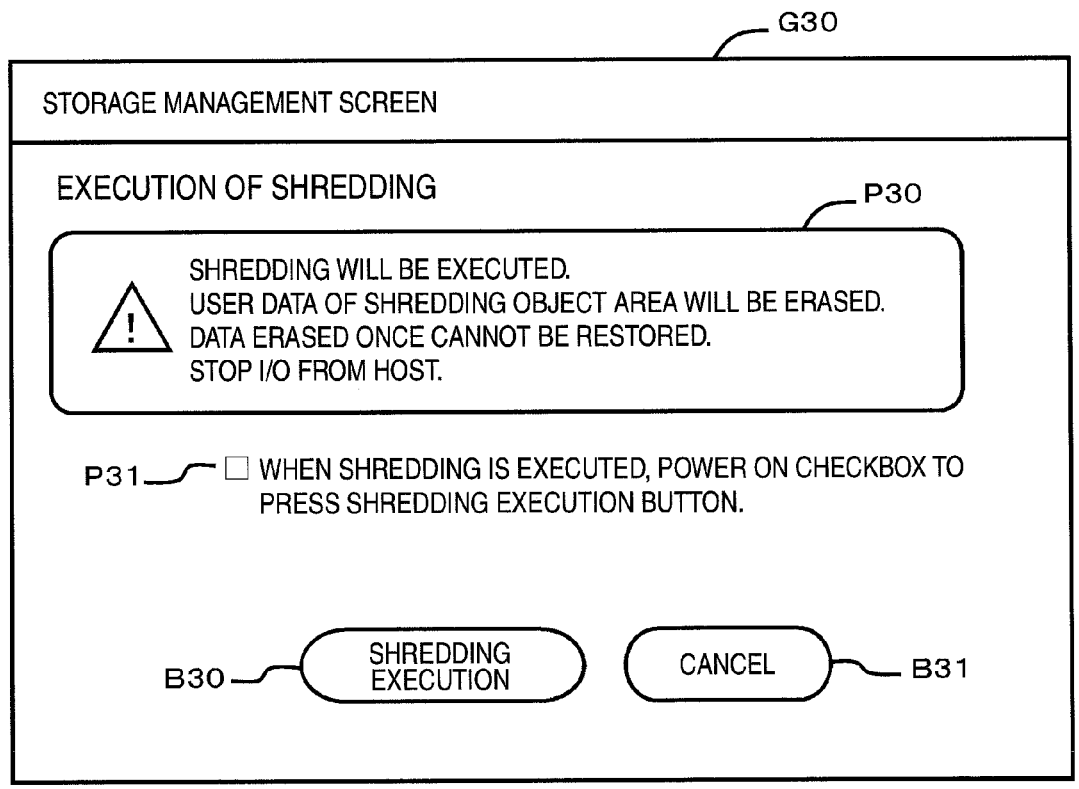
FIG. 15 is an example of a screen for instructing the execution of the shredding process.

Returning to FIG. 10, when the user sets the shredding parameters (S11), an execution instructing screen G30 shown in FIG. 15 is displayed in the management device 40. The execution instructing screen G30 includes a notice column P30, a recognizing part P31, an execution button B30 and a cancel button B31.

In the notice column P30, matters to be attended to during the operation of the shredding process are shown. Since the data shredded once cannot be restored, the recognizing part P31 functions to finally recognize the intention of the user.

However, when the disk drive as the shredding object belongs to the RAID group 22 that is redundant due to RAID1 to RAID6 or the like, the data erased in the shredding process can be restored by using other disk drive 21 in the same RAID group.

When the user carries out the shredding process, the user operates the execution button B30 (S12 in FIG. 10). When the user cancels the execution of the shredding process, the user may operate the cancel button B31.

Figure 16:
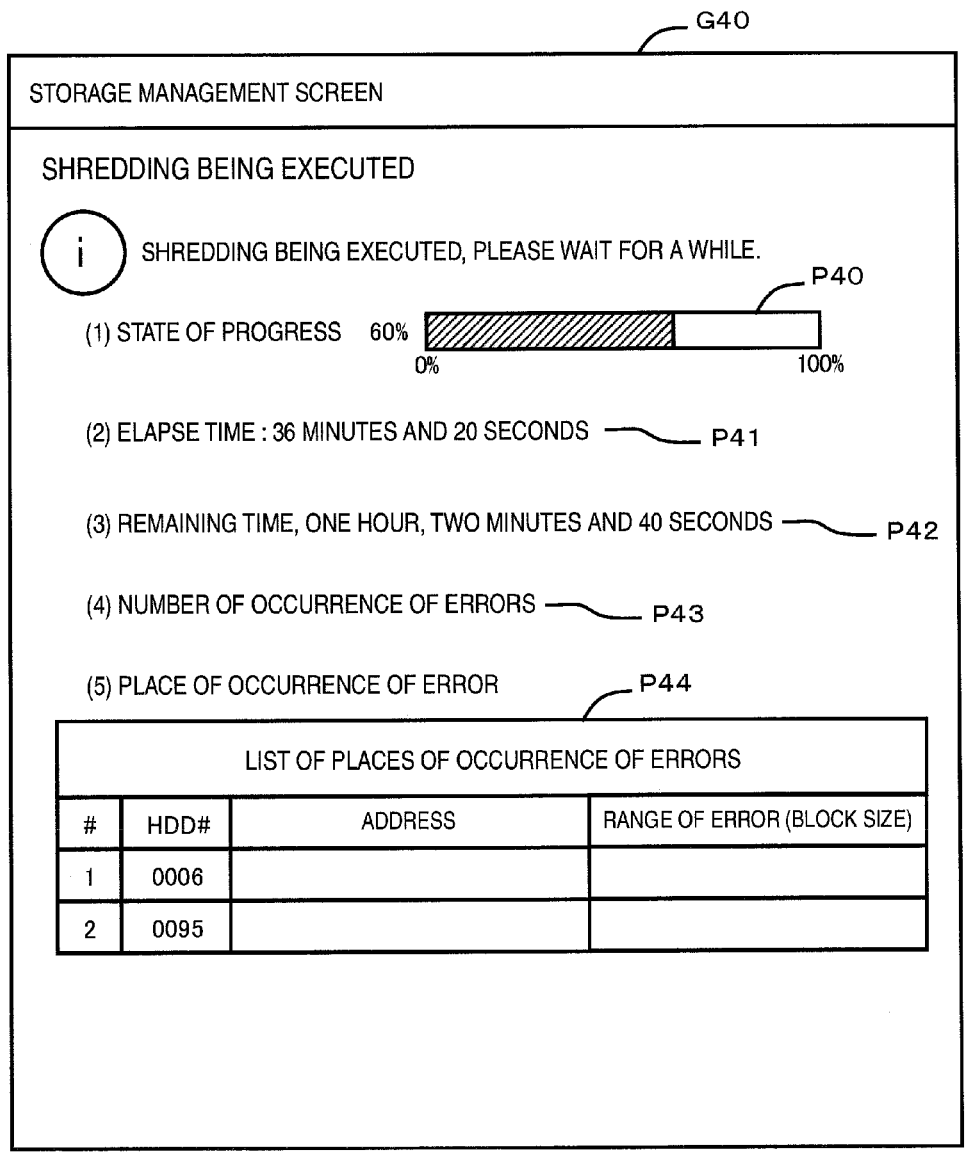
FIG. 16 is an example of a screen displayed during the execution of the shredding process.

When the shredding process is started, an executing screen G40 as shown in FIG. 16 is displayed (S13). The executing screen G40 includes, for instance, a progress state display part P40, an elapse time display part P41, a remaining time display time P42, an error occurrence number display part P43 and an error occurrence position display part P44.

The progress state display part P40 displays to which part the shredding process is completed in, for instance, a graph form of 0 to 100%. The elapse time display part P41 displays an elapse time after the shredding process is started. The remaining time display part P42 displays a remaining time till a time at which the shredding process is expected to be finished. The error occurrence number display part P43 displays the total number of write errors occurring during the shredding process. The error occurrence position display part P44 displays an address where the write error arises or the size of a block where the error arises.

Figure 17:
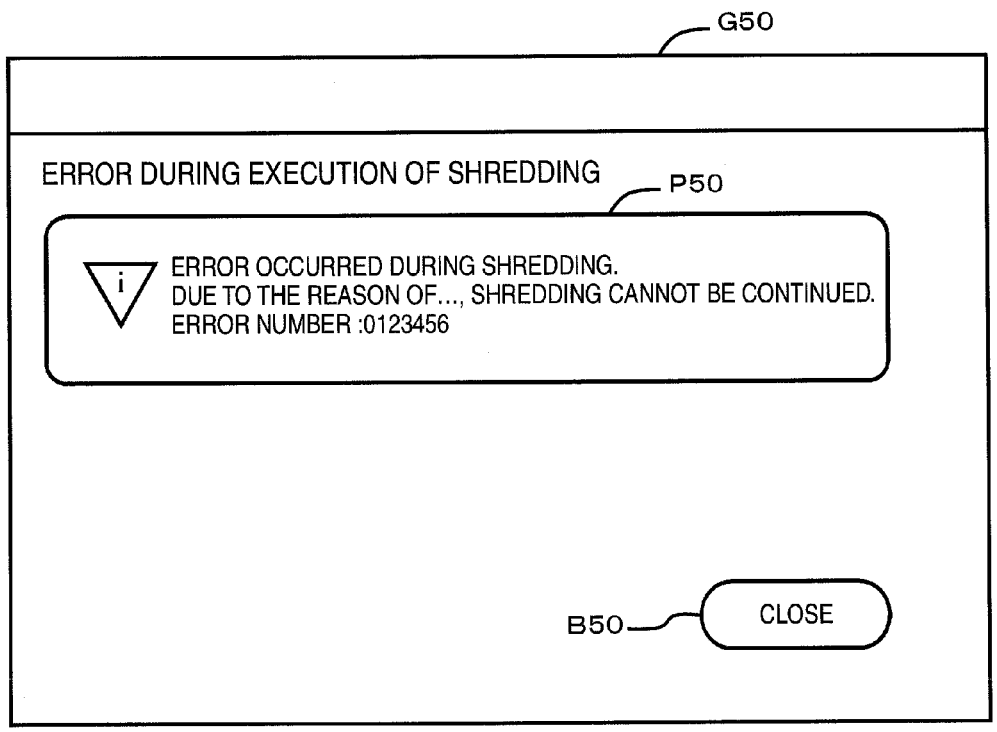
FIG. 17 is an example of a screen when an error arises.

When an abnormality arises in the controller 100 or the disk drive 21 during the shredding process and the error arises so that the data cannot be written (S14: YES), an error display screen G50 as illustrated in FIG. 17 is shown. The error display screen G50 is a screen for informing the user of the write error of the shredding data. This screen G50 includes a notification column P50 and a button B50.

In the notification column P50, a notice is displayed that the error arises during the writing operation of the shredding data. The button B50 is a button for allowing the screen G50 to close.

Figure 18:
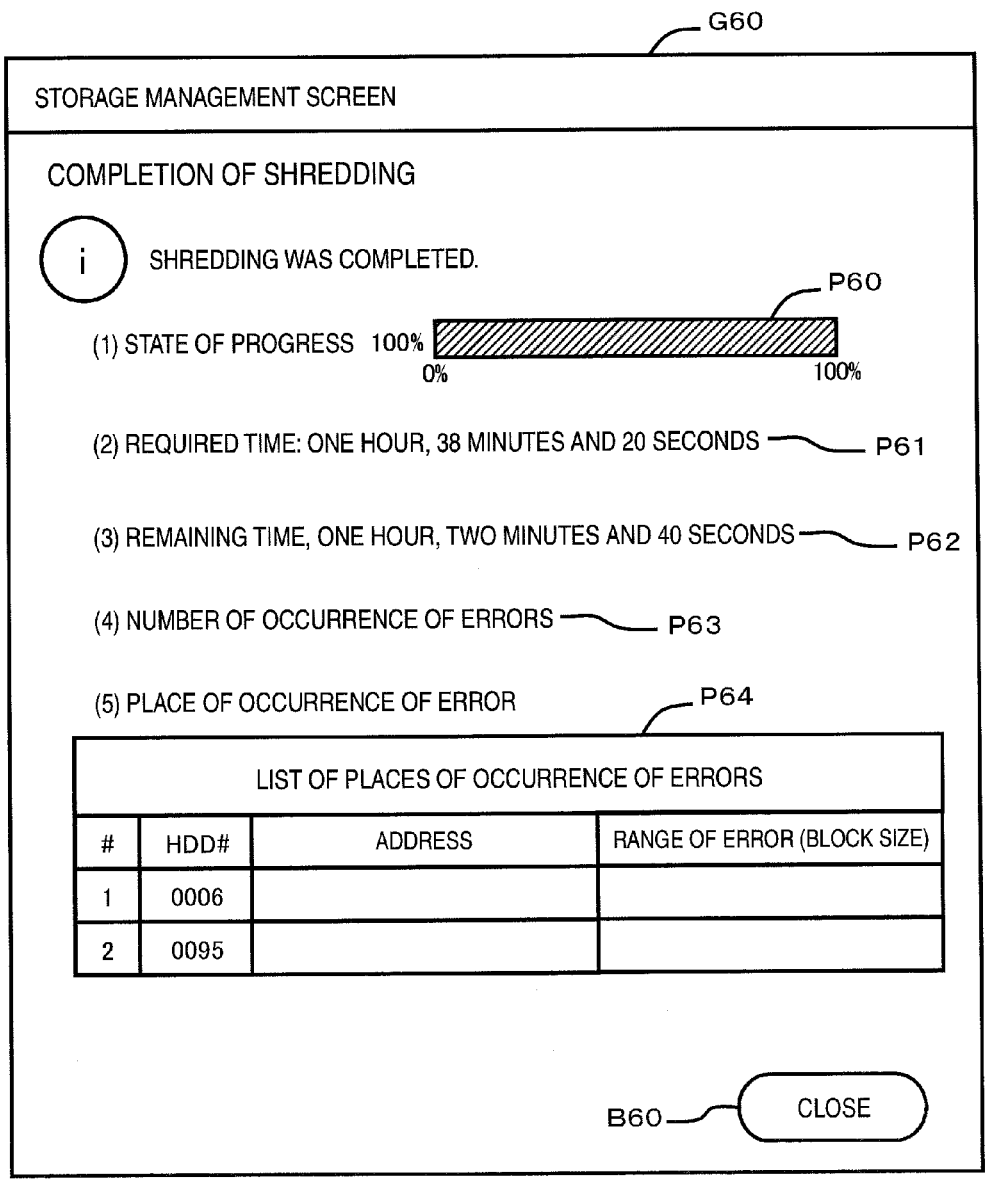
FIG. 18 is an example of a screen when the shredding process is completed.

When the write error of the shredding data does not arise (S14: NO), it is decided whether or not the shredding process is completed (S16). When the shredding process is completed (S16: YES), the management device 40 displays a process completion screen G60 as shown in FIG. 18 (S17). The management device 40 allows the executing screen G40 to be displayed until the shredding process is completed (S16: NO).

As shown in FIG. 18, the process completion screen G60 includes a progress state display part P60, an elapse time display part P61, a remaining time display time P62, an error occurrence number display part P63 and an error occurrence position display part P64 like the executing screen G40. Since the above-described parts P60 to P64 are the same as the parts P40 to P44 shown in FIG. 16, an explanation thereof will be omitted. A button B60 is a button for allowing the screen G60 to close.

Figure 11:
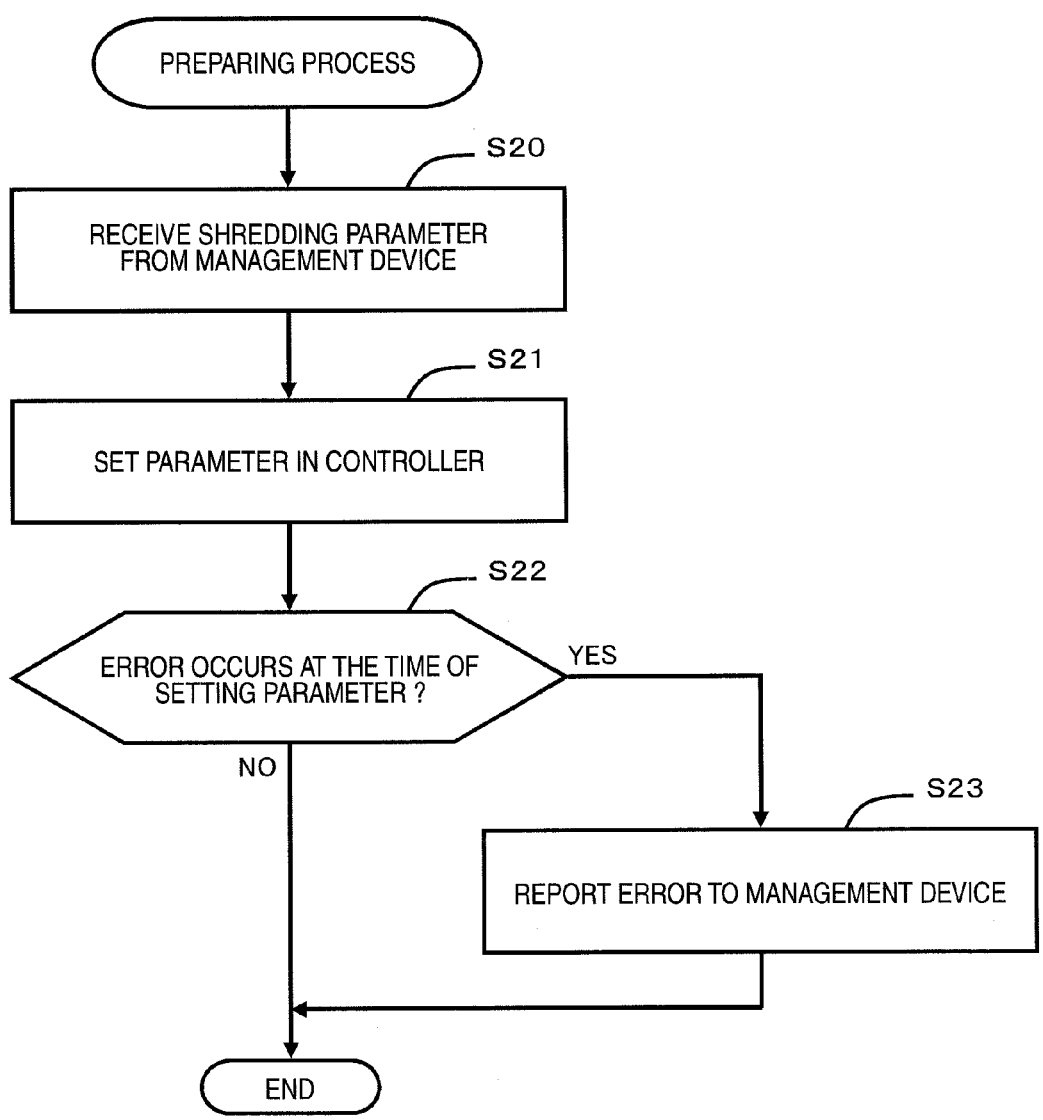
FIG. 11 is a flowchart for preparing to carry out the shredding process.

FIG. 11 shows a preparing process before the shredding process is started. This process is carried out by the controller 100. When the controller 100 receives the parameters for the shredding process from the management device 40 (S20), the controller 100 sets the parameters in the controller 100 (S21). To set the shredding parameters in the controller 100 means to allow the shredding parameter T10 to be stored in the local memory 17.

When the controller 100 allows the shredding parameter T10 to be stored in the local memory 17, the controller 100 decides whether or not the error arises (S22). When the error arises (S22: YES), the controller 100 notifies the management device 40 of the occurrence of the error (S23).

Figure 19:
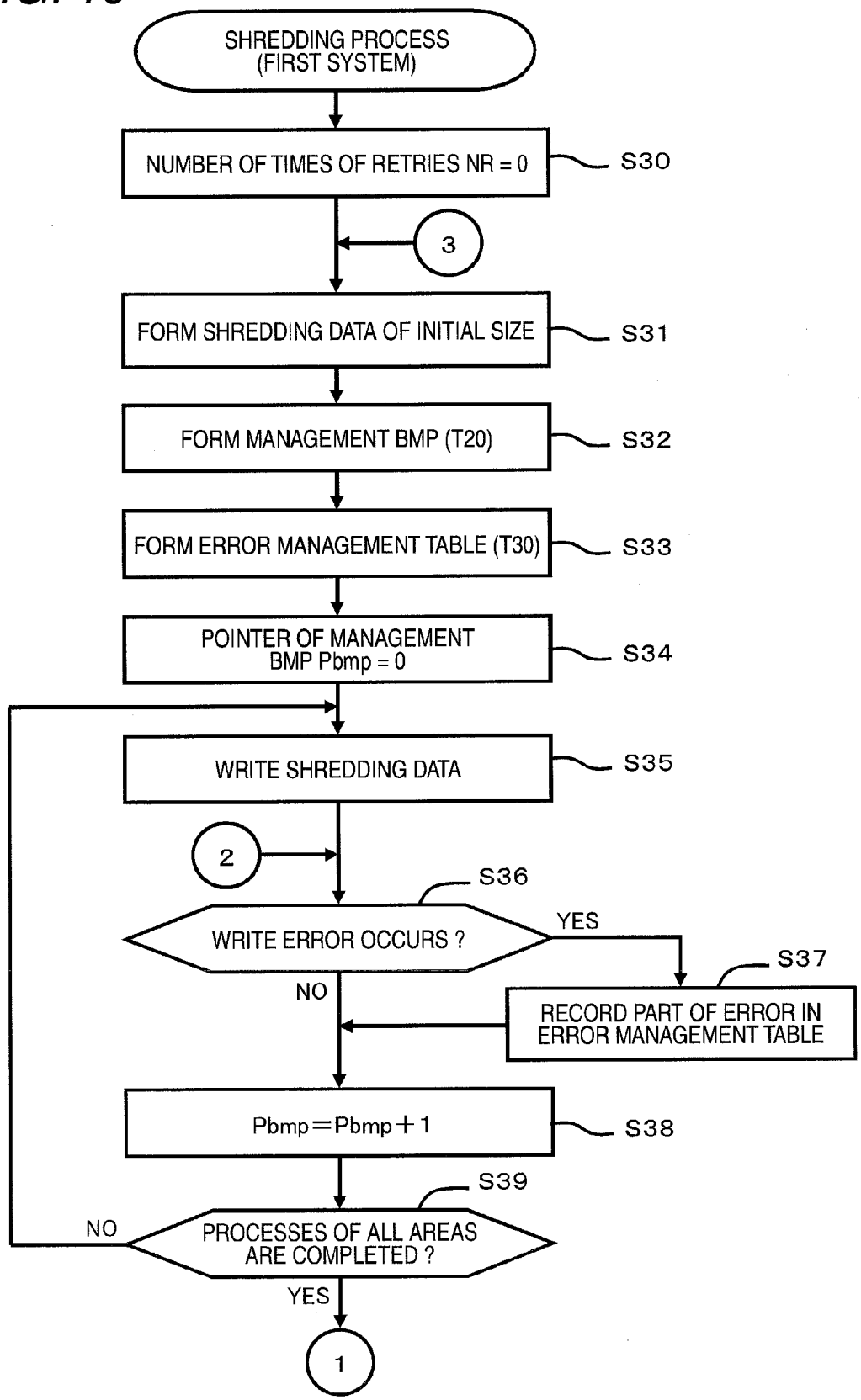
FIG. 19 is a flowchart of the shredding process including a retry process of a first system.
Figure 20:
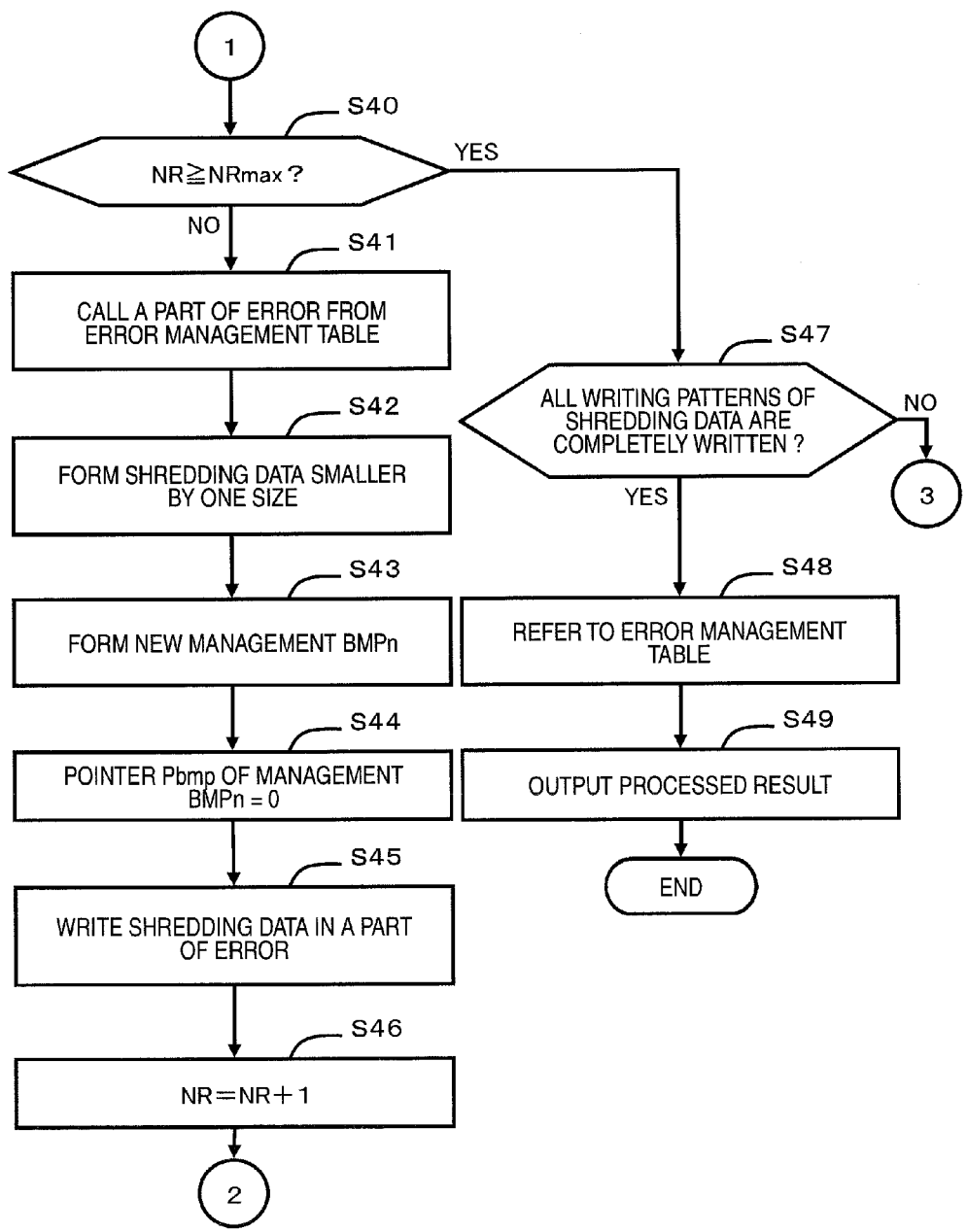
FIG. 20 is a flowchart of the shredding process including the retry process of the first system that is continued to the flowchart shown in FIG. 19.

Now, the shredding process including the retry process of the first system will be described below by referring to FIGS. 19 and 20. This process is carried out by the controller 100. The controller 100 initializes a variable NR for managing the number of times of retries (S30).

The controller 100 forms the shredding data of the initial size to allow the cache memory 14 to store the shredding data (S31). The controller 100 creates the management bit map T20 corresponding to the initial size to store the management bit map T20 in the local memory 17 (S32). Further, the controller 100 creates the error management table T30 for recording the detail of the error during the shredding process to store the error management table T30 in the local memory 17 (S33).

The controller 100 initializes a pointer Pbmp for indicating an address on the management bit map T20 (S34). Thus, a first written address of the shredding data is set to the first address of the storage area of the shredding object.

The controller 100 reads the shredding data of the initial size from the cache memory 14 and writes the shredding data in the first address of the area of the shredding object (S35). The controller 100 decides whether or not the error arises (S36).

When the write error arises (S36: YES), the controller 100 allows the error management table T30 to record the part where the error arises (S37). The state of the corresponding part of the management bit map T20 is changed from the "during execution" to the "error". The controller 100 moves forward the pointer of the management bit map T20 by one (S38). Then, the controller 100 decides whether or not the shredding data of the initial size tries to be written in all the range of the shredding object (S39).

The processes S35 to S39 are repeated until the shredding data of the initial size tries to be written in all the range of the shredding object (S39: NO). When the shredding data of the initial size tries to be generally written in the entire part of the range of the shredding object (S39: YES), the procedure shifts to S40 shown in FIG. 20.

The controller 100 decides whether or not the number of times of retries NR reaches an upper limit value NRmax (S40). The upper limit value NRmax of the number of times of retries is previously designated by P24 shown in FIG. 14.

When the number of times of retries NR does not reach the upper limit value NRmax (S40: NO), the controller 100 calls the part where the error arises (refer it also to as an error part, hereinafter) from the error management table T30 (S41). The controller 100 forms the shredding data smaller by one stage than the initial size to store the shredding data in the cache memory 14 (S42). The size of newly formed shredding data is ¼ as small as the initial size.

The controller 100 creates a new management bit map T20 correspondingly to the change of the size of the shredding data (S43). The controller 100 initializes the pointer of the newly formed management bit map T20 (S44) to write the shredding data of the small size in the error part (S45). The controller 100 adds one to the number of times of retries NR (S46) and returns to S36 in FIG. 19.

Namely, the controller 100 returns to S36, so that the controller 100 generally carries out the retry process of all error parts by using the shredding data of the block size smaller by one stage than the initial size. When the retry process using the block size smaller by one stage than the initial size is generally completed (S39: YES), the controller 100 decides again whether or not the number of times of retries NR reaches the upper limit value NRmax (S40). When NR does not reach NRmax (S40: NO), the controller 100 further makes the block size smaller by one stage to carry out the retry process generally in remaining error parts respectively.

When the number of times of retries NR reaches the upper limit value NRmax (S40: YES), the controller 100 decides whether or not all of writing patterns of the shredding algorithm are completed (S47). In an ordinary shredding algorithm, a plurality of shredding data is written in the same place a plurality of times to erase the data stored therein (see P22 in FIG. 13). Now, a method for writing the shredding data several times in accordance with the shredding algorithm will be referred to as a "writing pattern" hereinafter.

For instance, the writing pattern of the first shredding data is written in the entire part of the storage area, then, the second shredding data is overwritten on the entire part of the storage area, and further, the third shredding data is overwritten on the storage area. Thus, in S47, it is decided whether or not all of the predetermined shredding data are completely written.

When there is the shredding data of the writing pattern that is not written yet (S47: NO), the controller 100 returns to S31 to form the shredding data of a next writing pattern and store the shredding data in the cache memory 14. A process for writing the next shredding data in the storage area follows in the same way as described above.

When the writing pattern of the shredding algorithm is completely finished (S47: YES), the controller 100 refers to the error management table T30 (S48) and outputs a processed result to the management device 40 (S49). Thus, the management device 40 allows the process completion screen as described in FIG. 18 to be displayed.

When the error remains even by carrying out the retry process with the size of the minimum unit, for instance, the retry process of the error part is carried out prescribed number of times. Nevertheless, when the error is not cancelled, that is, when the shredding data of the size of the minimum unit cannot be normally written, the shredding process of the error part is skipped to advance to a next step (S47). Thus, the procedure can move to a process for writing the next shredding data.

Figure 21:
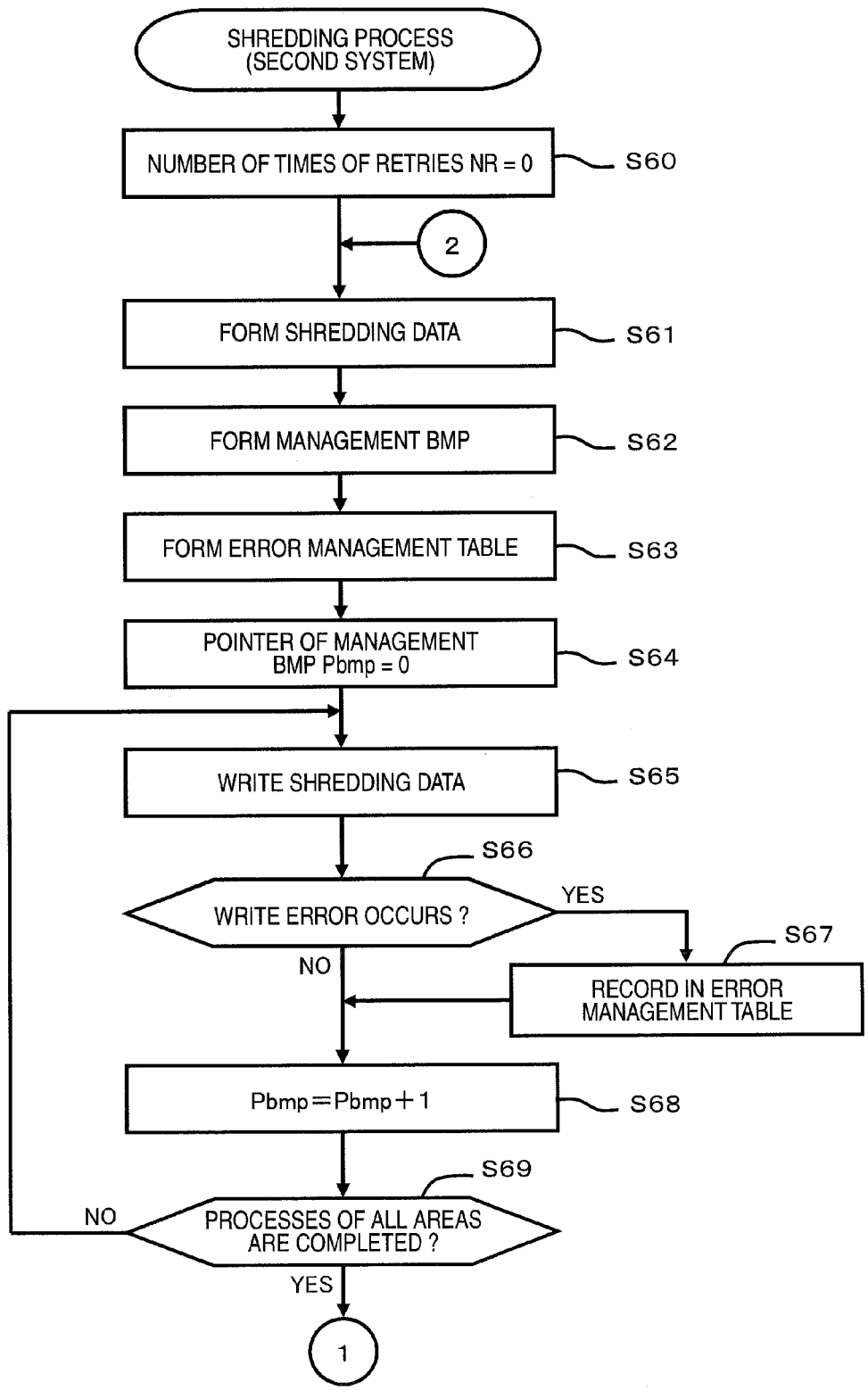
FIG. 21 is a flowchart of the shredding process including a retry process of a second system.
Figure 22:
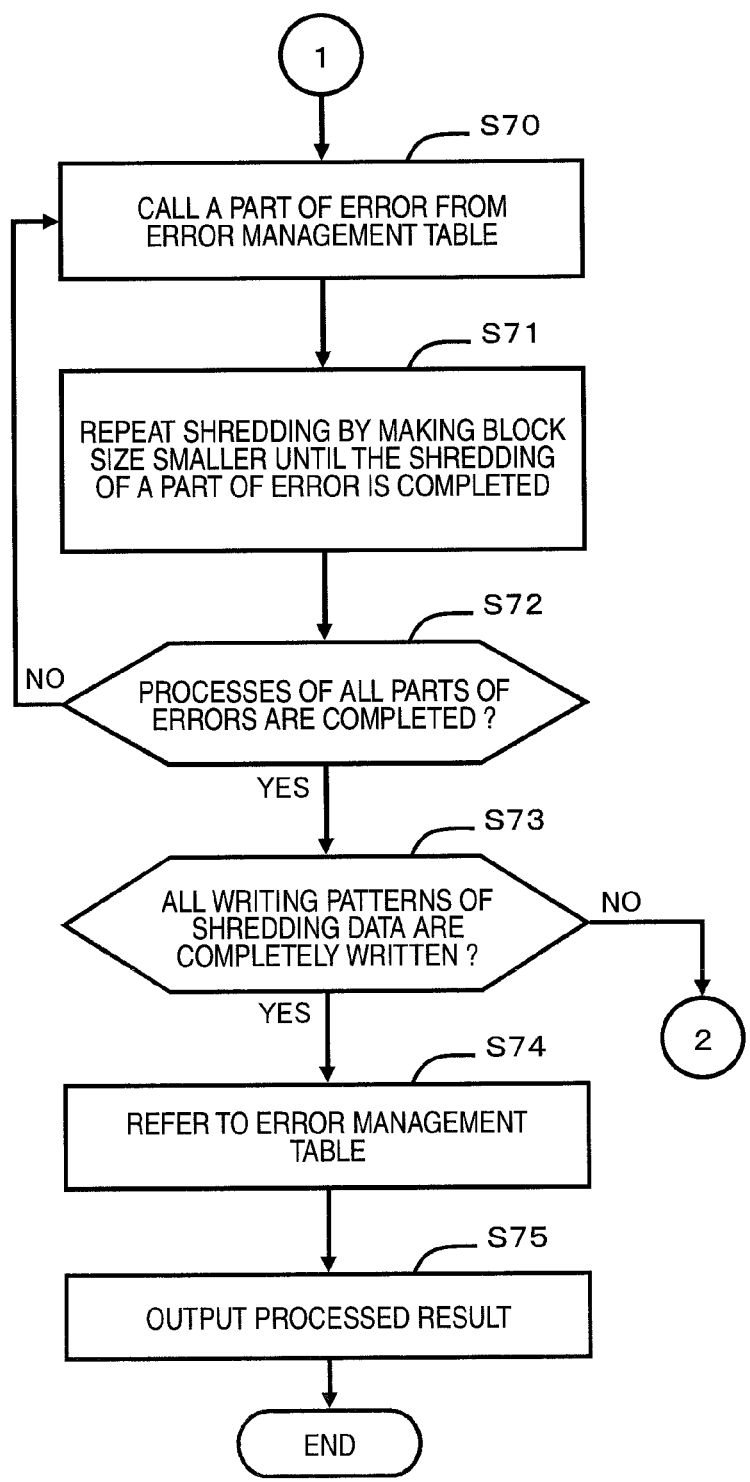
FIG. 22 is a flowchart of the shredding process including the retry process of the second system that is continued to the flowchart shown in FIG. 21.

Now, the shredding process including the retry process of the second system will be described below by referring to FIGS. 21 and 22. This process is also carried out by the controller 100 like the first system. The controller 100 initializes a variable NR for managing the number of times of retries (S60).

The controller 100 forms the shredding data of the initial size to allow the cache memory 14 to store the shredding data (S61). The controller 100 creates the management bit map T20 corresponding to the initial size to store the management bit map T20 in the local memory 17 (S62). Further, the controller 100 creates the error management table T30 to store the error management table T30 in the local memory 17 (S63).

The controller 100 initializes a pointer Pbmp for indicating an address on the management bit map T20 (S64) to write the shredding data of the initial size in the first address of the area of the shredding object (S65). The controller 100 decides whether or not the error arises (S66).

When the write error arises (S66: YES), the controller 100 allows the error management table T30 to record the part where the error arises (S67). The controller 100 moves forward the pointer of the management bit map T20 by one (S68). Then, the controller 100 decides whether or not the shredding data of the initial size tries to be written in all the range of the shredding object (S69).

The processes S65 to S69 are repeated until the shredding data of the initial size tries to be written in all the range of the shredding object (S69: NO). When the shredding data of the initial size tries to be generally written in the entire part of the range of the shredding object (S69: YES), the procedure shifts to S70 shown in FIG. 22.

The controller 100 calls the error part from the error management table T30 (S70) and carries out the retry process of the error part as much as possible (S71). That is, the retry process of the error part detected in the initial shredding process is carried out by reducing the size of the shredding data until the number of times of retries NR reaches the upper limit value NRmax (S71).

The controller 100 decides whether or not the retry process of all error parts detected by the initial shredding process is completely carried out as much as possible (S72). When there is the error part in which the retry process is not finished yet (S72: NO), the controller 100 returns to S70.

When the retry process of all the error parts is carried out as much as possible (S72: YES), the controller 100 decides whether or not the writing patterns of all shredding data determined by the shredding algorithm are completely written (S73).

When there is the writing pattern of the shredding data that is not written yet (S73: NO), the controller returns to S61 to repeat the above-described steps S61 to S72. When the writing patterns of all the shredding data are written in the area of the shredding object (S73: YES), the controller 100 refers to the error management table T30 (S74) and outputs a processed result to the management device 40 (S75).

Figure 23:
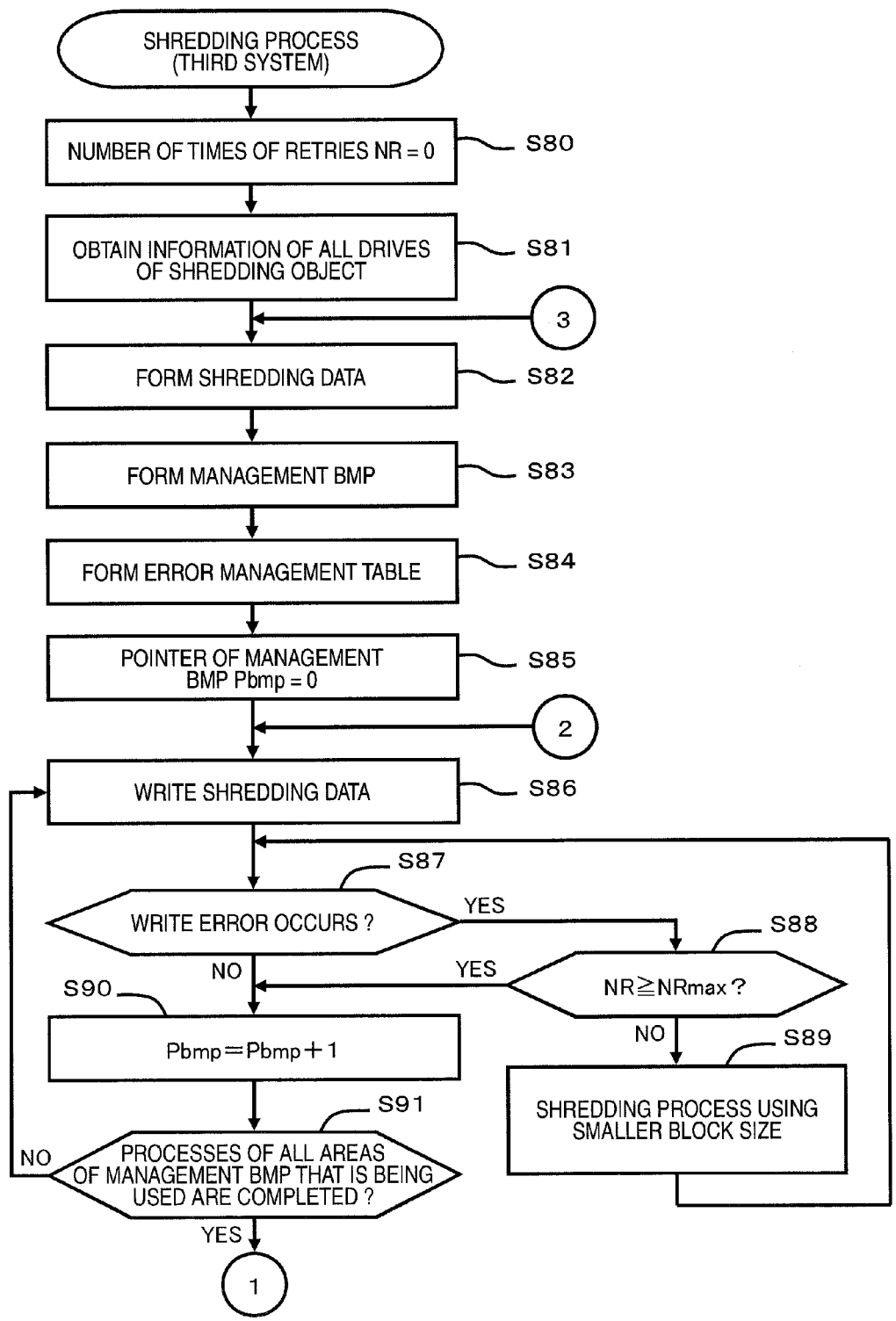
FIG. 23 is a flowchart of the shredding process including a retry process of a third system.
Figure 24:
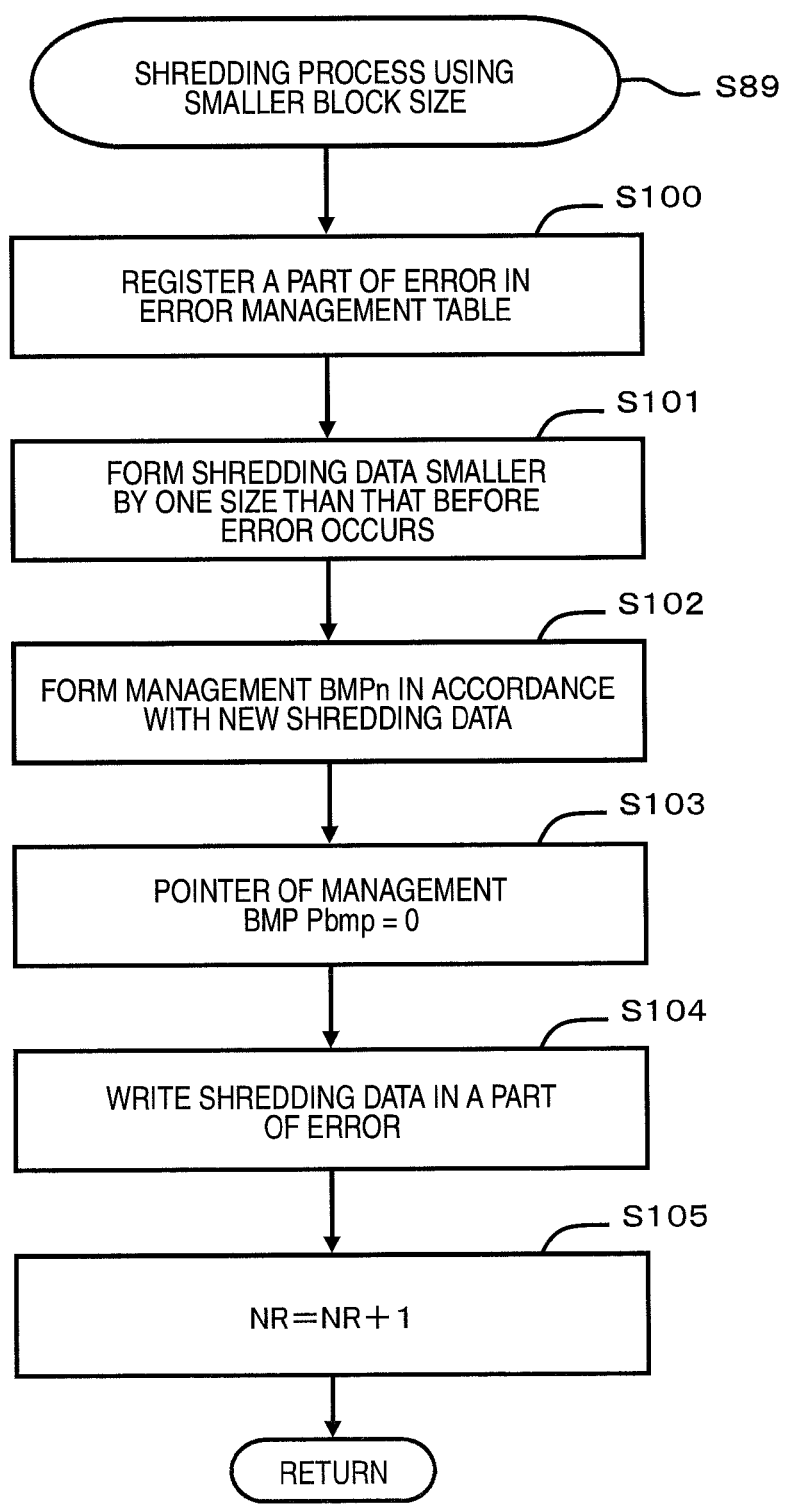
FIG. 24 is a flowchart showing in detail a process of S89 of the flowchart shown in FIG. 23.

Now, referring to FIGS. 23 and 24, the shredding process including the retry process of the third system will be described below. This process is also carried out by the controller 100. Initially, the controller 100 initializes a variable NR for managing the number of times of retries (S80). Subsequently, the controller 100 obtains information of all the disk drives 21 as the shredding objects from the system management table T11 (S81).

In this process, a case is also included and explained that the area of the shredding object is set over a plurality of disk drives 21. The above-described first system and the second system may be also applied to the area of the shredding object spread over the plurality of disk drives 21.

The controller 100 forms the shredding data of the initial size to allow the cache memory 14 to store the shredding data (S82). The controller 100 creates the management bit map T20 corresponding to the initial size to store the management bit map T20 in the local memory 17 (S83). Further, the controller 100 creates the error management table T30 to store the error management table T30 in the local memory 17 (S84).

The controller 100 initializes a pointer Pbmp for indicating an address on the management bit map T20 (S85) to write the shredding data of the initial size in the first address of the area of the shredding object (S86). The controller 100 decides whether or not the write error arises (S87).

When the write error arises (S87: YES), the controller 100 decides whether or not the number of times of retries NR reaches the upper limit value NRmax (S88). When the number of times of retries NR does not reach the upper limit value NRmax (S88: NO), the controller 100 carries out the shredding process using a smaller block size (S89). The detail of the step S89 will be described below by referring to FIG. 24.

Either when the write error does not arise (S87: NO) or when the number of times of retries NR reaches the upper limit value NRmax (S88: YES), the controller 100 moves forward the pointer of the management bit map T20 by one (S90). Then, the controller 100 decides whether or not the shredding data is written in all areas managed by the management bit map T20 that is currently being used (S91).

When the write error does not arise in the initial shredding process (S87: NO), in the step S91, it is decided whether or not the shredding data of the initial size is written in all of the area of the shredding object.

When the write error arises in the initial shredding process (S87: YES), in the step S91, it is decided whether or not the shredding data of the size set in the step S89 is written in all of the area of the shredding object.

When the area where the shredding data is not written yet remains (S91: NO), the controller 100 returns to the step S86. When the shredding data is written in all of the areas managed by the management bit map T20 that is now being used (S91: YES), the procedure shifts to a process shown in FIG. 25.

The detail of the step S89 will be described below by referring to a flowchart shown in FIG. 24. The controller 100 registers the part where the error arises in the error management table T30 (S100). Subsequently, the controller 100 forms the shredding data of the block size smaller by one stage than the block size used before the error arises to store the shredding data in the cache memory 14 (S101).

The controller 100 creates the management bit map T20 in accordance with the shredding data formed in the step S101 (S102) to initialize the pointer (S103). The controller 100 writes the shredding data of the small size in the error part (S104) to increase the number of times of retries NR by one (S105) and returns to the step S87 shown in FIG. 23.

Figure 25:
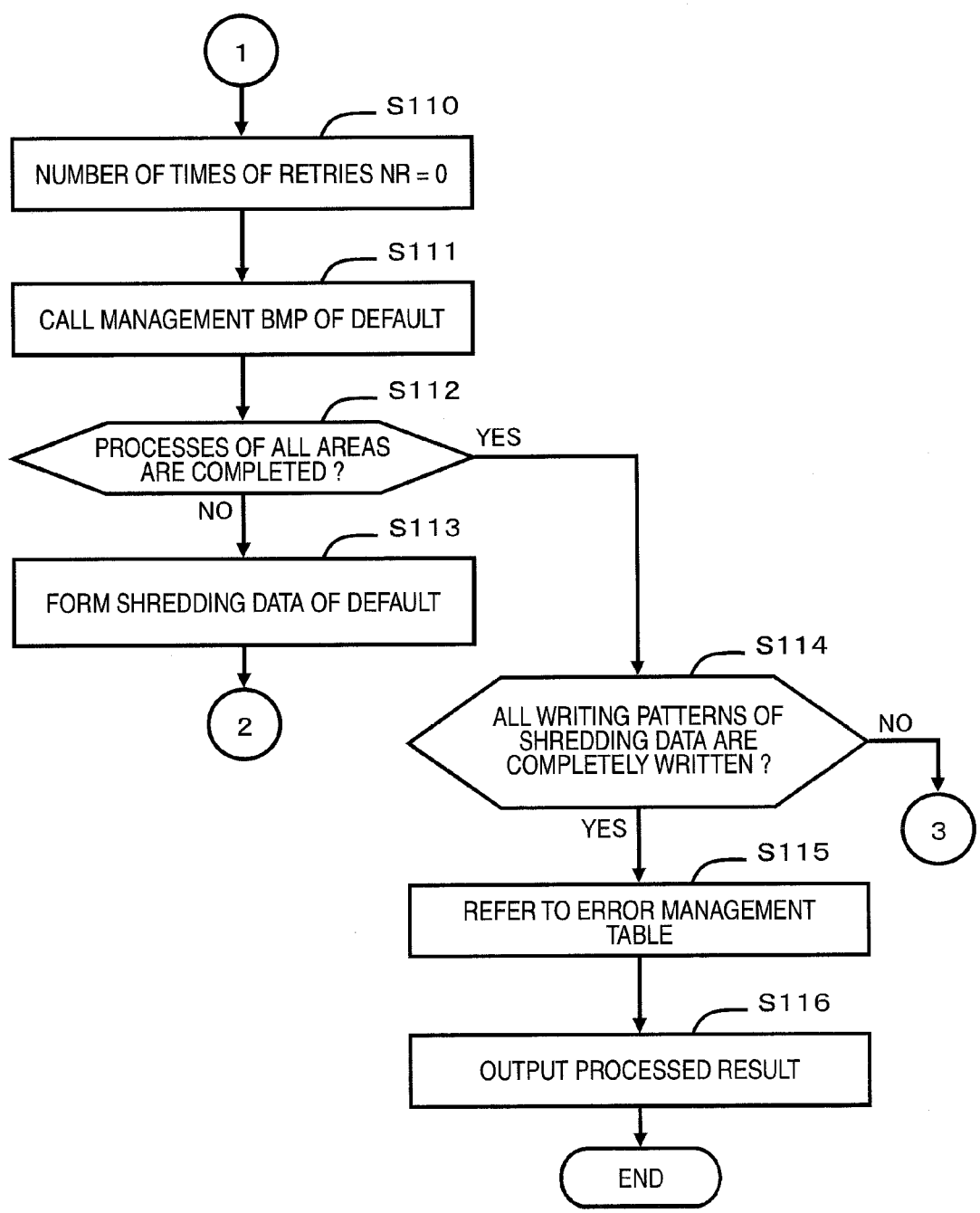
FIG. 25 is a flowchart of the shredding process including the retry process of the third system that is continued to the flowchart shown in FIG. 23.

Now, a flowchart shown in FIG. 25 will be described below. The controller 100 initializes the number of times of retries NR (S110) and calls the management bit map T20 of default (S111). The management bit map T20 of default indicates a management bit map that is used in the initial shredding process and partitioned by the initial size.

The controller 100 decides whether or not the shredding data is written in all of the areas of the shredding object (S112). When there is an area where the shredding data is not written yet (S112: NO), the controller 100 forms the shredding data of the initial size to store the shredding data in the cache memory 14 and returns to the step S86 shown in FIG. 23.

When the shredding data is written in all of the areas of the shredding object (S112: YES), the controller 100 decides whether or not the writing patterns of all shredding data determined by the shredding algorithm are completely written (S114).

When there is the writing pattern of the shredding data that is not written yet (S114: NO), the controller 100 returns to the step S82 shown in FIG. 23. When the writing patterns of all the shredding data are written in the areas of the shredding object (S114: YES), the controller 100 refers to the error management table T30 (S115) and outputs a processed result to the management device 40 (S116).

When the writing operation of the shredding data of the initial size that is firstly executed is normally completed in all of the areas of the shredding object (S87; NO, S91: YES), a decision of YES is obtained in the step S112.

Figure 26:
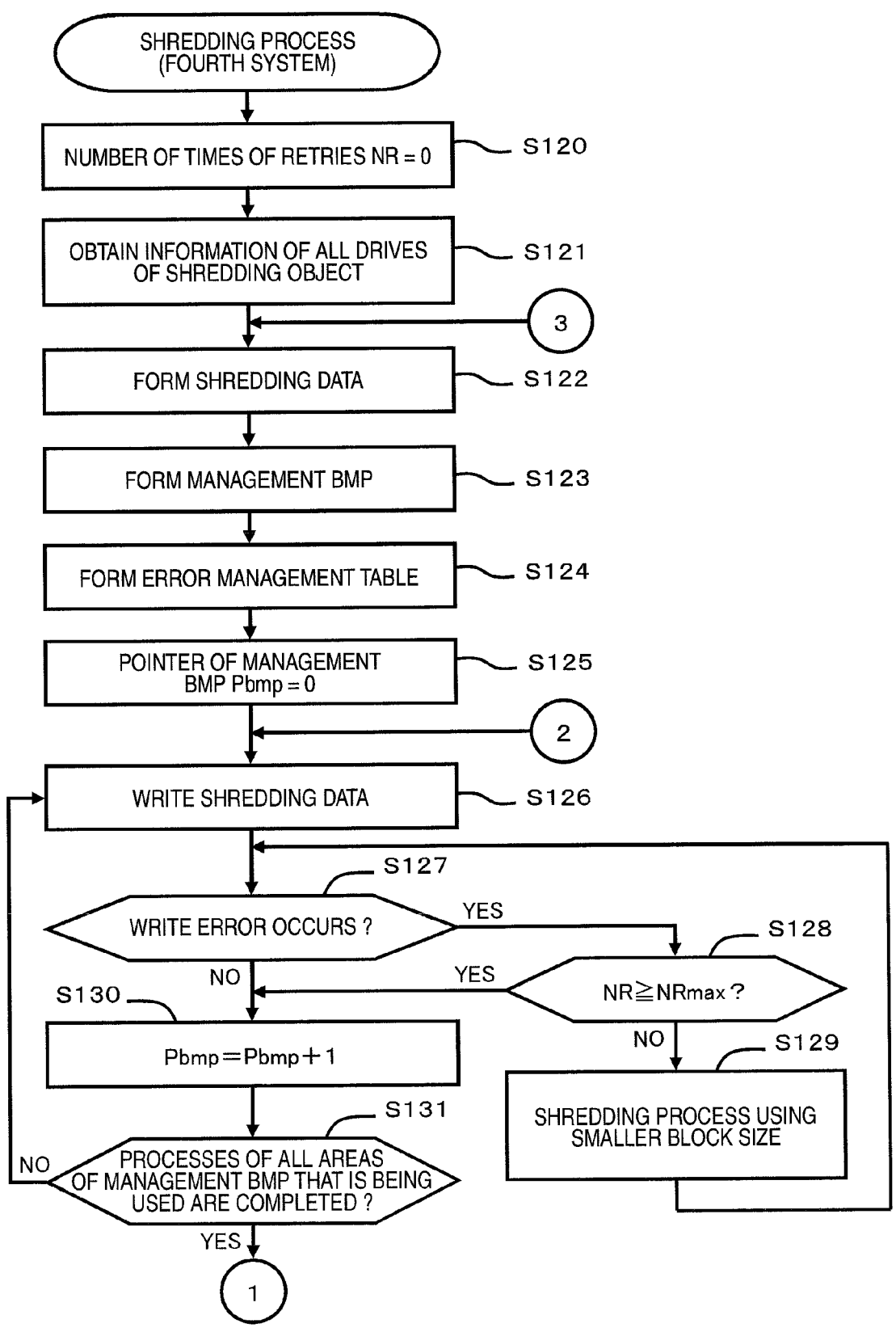
FIG. 26 is a flowchart of the shredding process including a retry process of a fourth system.
Figure 27:
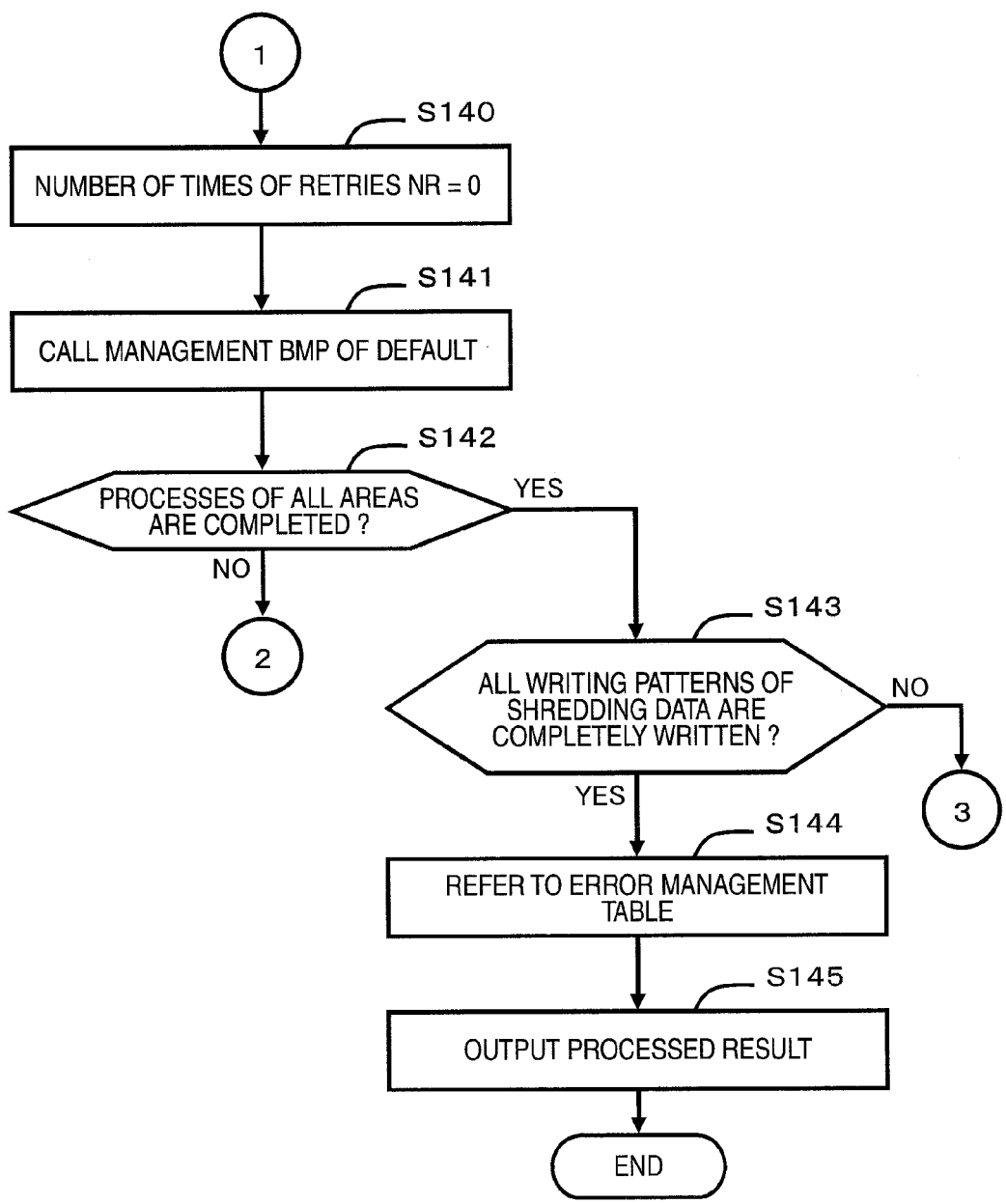
FIG. 27 is a flowchart of the shredding process including the retry process of the fourth system that is continued to the flowchart shown in FIG. 26.

Now, referring to FIGS. 26 and 27, the shredding process including the retry process of the fourth system will be described below. This process is also carried out by the controller 100. The controller 100 initializes the number of times of retries NR (S120) to obtain information of all the disk drives 21 as the shredding objects from the system management table T11 (S121).

The controller 100 forms the shredding data of the initial size to allow the cache memory 14 to store the shredding data (S122). The controller 100 creates the management bit map T20 corresponding to the initial size to store the management bit map T20 in the local memory 17 (S123). Further, the controller 100 creates the error management table T30 to store the error management table T30 in the local memory 17 (S124).

The controller 100 initializes a pointer Pbmp for indicating an address on the management bit map T20 (S125) to write the shredding data of the initial size in the first address of the area of the shredding object (S126). The controller 100 decides whether or not the write error arises (S127).

When the write error arises (S127: YES), the controller 100 decides whether or not the number of times of retries NR reaches the upper limit value NRmax (S128). When the number of times of retries NR does not reach the upper limit value NRmax (S128: NO), the controller 100 carries out the shredding process using a smaller block size (S129). In the step S129, the same process as that described in FIG. 24 is carried out.

Either when the write error does not arise (S127: NO) or when the number of times of retries NR reaches the upper limit value NRmax (S128: YES), the controller 100 moves forward the pointer of the management bit map T20 by one (S130). Then, the controller 100 decides whether or not the shredding data is written in all areas managed by the management bit map T20 that is currently being used (S131).

When the area where the shredding data is not written yet remains (S131: NO), the controller 100 returns to the step S126. When the shredding data is written in all of the areas managed by the management bit map T20 that is now being used (S131: YES), the procedure shifts to a process shown in FIG. 27.

Now, a flowchart shown in FIG. 27 will be described below. The controller 100 initializes the number of times of retries NR (S140) and calls the management bit map T20 of default (S141). The controller 100 decides whether or not the shredding data is written in all of the areas of the shredding object (S142). When there is the area where the shredding data is not written yet (S142: NO), the controller 100 returns to the step S126 shown in FIG. 26. The fourth system is different from the third system in view of a point that the controller 100 returns to the step S126 without forming the shredding data of the initial size.

When the shredding data is written in all of the areas of the shredding object (S142: YES), the controller 100 decides whether or not the writing patterns of all shredding data determined by the shredding algorithm are completely written (S143).

When there is the writing pattern of the shredding data that is not written yet (S143: NO), the controller 100 returns to the step S122 shown in FIG. 26. When the writing patterns of all shredding data are written in the areas of the shredding object (S143: YES), the controller 100 refers to the error management table T30 (S144) and outputs a processed result to the management device 40 (S145).

Since this embodiment is constructed as described above, below-described effects are achieved.

In this embodiment, since the initial shredding process can be carried out by using a relatively large block size, the number of times of writings of the shredding data can be reduced and a time necessary for the shredding process can be shortened.

In this embodiment, since the progress state of the shredding data or the state of the occurrence of the write error is managed, even when the write error arises, the shredding process or the retry process can be carried out.

In this embodiment, when the write error arises during the writing operation of the shredding data, the block size is diminished to retry to carry out the shredding process of the error part. Accordingly, the range of the shredding process can be increased and the reliability of the shredding process can be improved.

In this embodiment, any one of retry methods can be selected from the previously prepared first system to fourth system to start the shredding process. Therefore, the user can select the retry method depending on the size of the area of the shredding object to improve the maneuverability.

[Second Embodiment]

Now, referring to FIGS. 28 and 29, a second embodiment of the present invention will be described below. This embodiment corresponds to a modified embodiment of the first embodiment. In this embodiment, a basic chassis 10 carries out a shredding process of data stored in another basic chassis 10E provided in an external part of the basis chassis 10.

Figure 28:
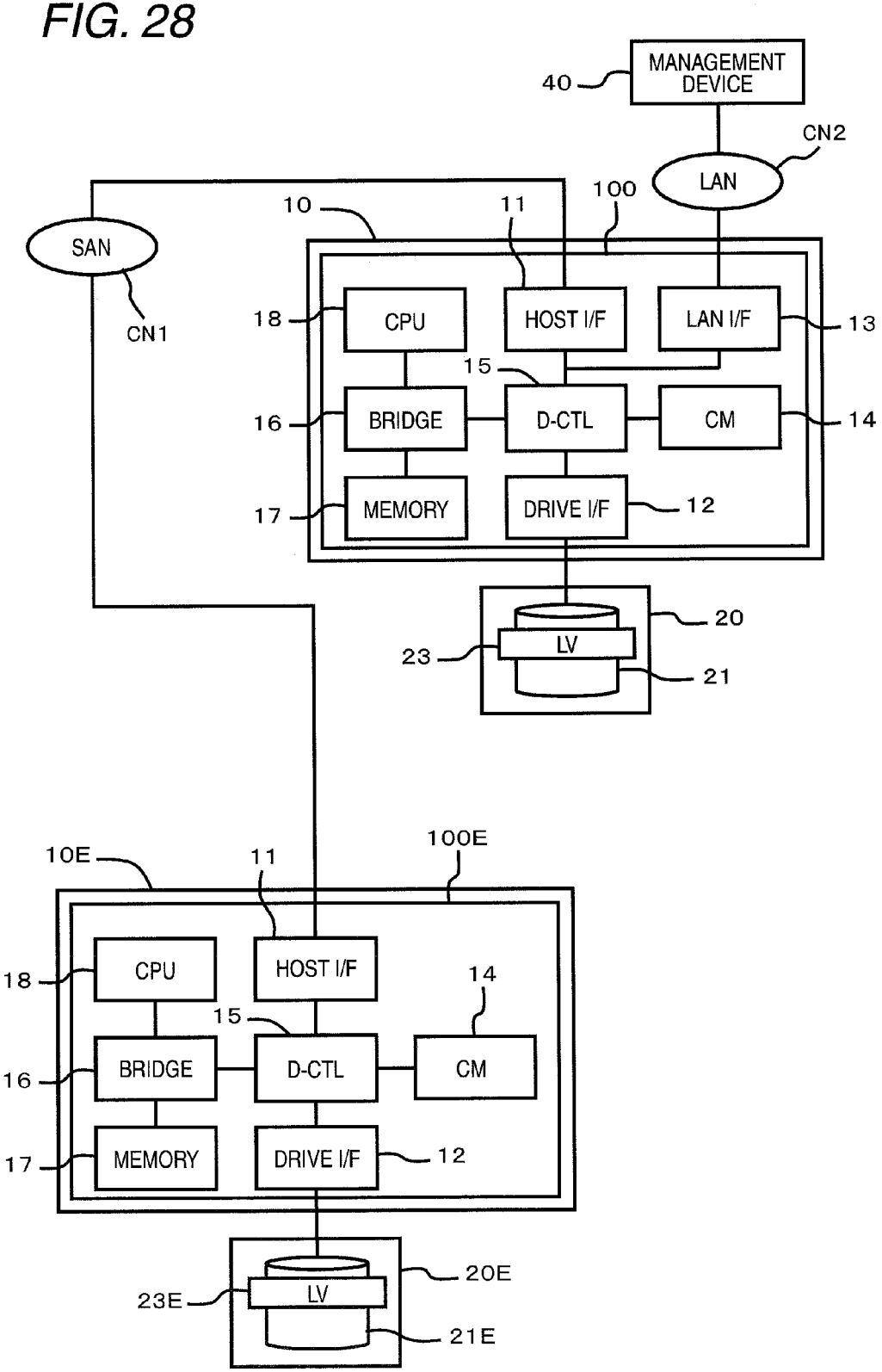
FIG. 28 is an entire block diagram of a second embodiment of a storage system to which the present invention is applied.

FIG. 28 shows an entire structure of a storage system according to this embodiment. In this system, a plurality of basic chassis 10 and 10E are included. The basic chassis 10 and another basis chassis 10E are respectively provided in separate places.

An initiator port provided in a host interface 11 of the basic chassis 10 is connected to a target port provided in a host interface 11 of another basic chassis 10E through a communication network CN1.

Another basic chassis 10E is connected to an increased chassis 20E. A controller 100E of another basic chassis 10E controls an input and output of data to a logical volume 23E. The basic chassis 10 has a table T50 (see FIG. 29) for storing information for accessing the logical volume 23E of the other basic chassis 10E. The basic chassis 10 can provide the logical volume 23E of the other basic chassis 10E to a host 30 as if the logical volume 23E were a logical volume 23 in the basic chassis 10. In FIG. 28, an illustration of the host 30 is omitted.

Figure 29:
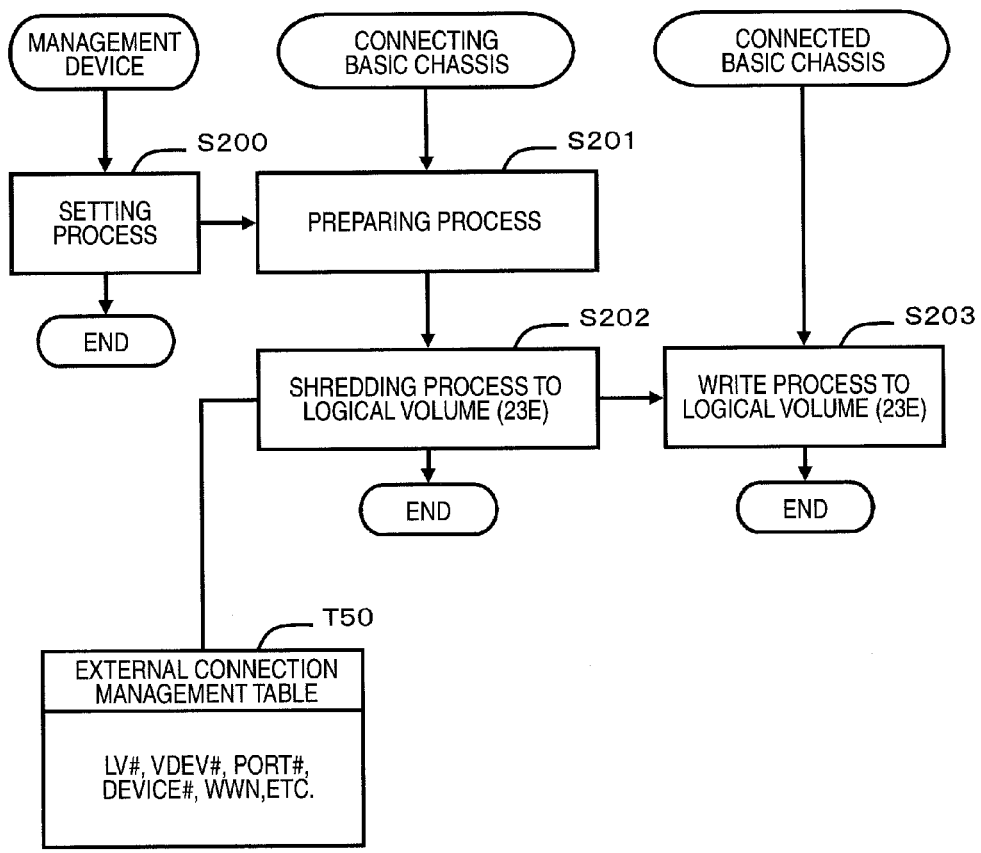
FIG. 29 is a flowchart showing a summary of a shredding process in the second embodiment.

FIG. 29 shows a summary of a shredding process in this embodiment. One basic chassis 10 is called a connecting basic chassis (a storage controller of a connecting side), and the other basic chassis 10E is called a connected basic chassis (a storage controller of a connected side). The logical volume 23E managed by the basic chassis 10E of the connected side is called an external volume 23E.

A management device 40 sets shredding parameters in a controller 100 in the basic chassis 10 of the connecting side (S200). The shredding parameters are set, so that the controller 100 prepares the execution of the shredding process of the external volume 23E (S201).

Then, the controller 100 carries out the shredding process to the external volume 23E (S202). The controller 100 refers to the external connection management table T50 to transmit a write command for writing the shredding data in the external volume 23E to the controller 100E of the basic chassis 10E of the connected side.

In the external connection management table T50, is stored the information necessary for the controller 100 to access the external volume 23E. As the necessary information, for instance, a device number for specifying the controller 100E of the connected side, a volume number of the external volume, a port number used for a communication, etc. may be exemplified.

When controller 100E of the basic chassis 10E of the connected side receives the write command from the controller 100, the controller 100E writes the shredding data received from the controller 100 in the external volume 23E and transmits a result thereof to the controller 100 (S203). Since the detail of the shredding process is described in the first embodiment, an explanation thereof will be omitted.

In this embodiment constructed as described above, the controller 100 can carry out the shredding process to the external volume 23E through the other controller 100E.

Accordingly, even when the controller 100E of the connected side does not include a shredding function or meets only an old shredding algorithm, the shredding function, the shredding algorithm or a plurality of retry systems provided in the controller 100 can be employed to erase the data of the external volume 23E.

The present invention is not limited to the above-described embodiments. A person with ordinary skill in the art can make various additions or changes within a range of the present invention. For instance, the disk drives may be mounted on the basic chassis.

What is claimed is:

1. A storage controller configured to allow a storage device to input and output data, the storage controller comprising:
   a memory; and
   a processor configured to:
   carry out a data erasing process for erasing the data stored in the storage areas by writing erasing data of a first size in the storage areas;
   manage a state of the progress of the data erasing process;
   select a second size of data, among a plurality of sizes managed on the memory of the storage controller, based on the state of the progress of the data erasing process; and
   change the size of the erasing data from the first size to the selected second size.

2. The storage controller according to claim 1,
   wherein the processor is further configured to:
   detect a first storage area where an error related to the data erasing process with erasing data of the first size has occurred and the data erasing process is unfinished based on the state of the progress of a data erasing process managed by the processor;
   select the second size among a plurality of sizes managed on a memory of the storage controller; and
   carry out again the data erasing process with erasing data of the second size for the detected first storage area.

3. The storage controller according to claim 2,
   wherein the second size is smaller than the first size.

4. The storage controller according to claim 1, wherein the processor is configured to provide a plurality of data shredding processing options to erase said data, and is further configured to permit a user to select one of the data shredding processing options.

5. The storage controller according to claim 4, wherein the data shredding processing options include, when an error has been detected in the data:
   a) skipping a part of the error to generally shred an object range, and, then, retrying the part of the error which was skipped, wherein, during said retry of the part of the error, a block size of the data for the retry is made smaller to generally shred all parts of the error;
   b) skipping a part of the error to generally shred an object range, and, then, retrying the skipped part of the error, wherein, during the retry, a first part of the error is shredded completely before moving to a next part of the error;
   c) immediately retrying a part of the error, and then, shredding a remaining object range with a default block size, wherein, during the retry, a part of the error is shredded until a block size becomes a predetermined minimum block size; and
   d) immediately retrying a part of the error, and then shredding a remaining object range with a smaller block size, wherein during the retry, a part of the error is shredded until the block size becomes a predetermined minimum block size.

6. The storage controller according to claim 4, wherein the processor is configured to permit a user to select a retry number of data shredding processes to erase said data.

7. The storage controller according to claim 1, wherein the processor is configured to permit a user to select a retry number of data shredding processes to erase said data.

8. The storage controller according to claim 1, wherein the storage device comprises a RAID device including a plurality of disk drives, wherein the processor is configured so that, if data shredding is performed to erase data in one of said plurality of disk drives, the processor restores the erased data in another one of the plurality of disk drives.

9. A method of operating a storage controller configured to allow a storage device to input and output data, the storage controller including a memory and a processor, the method comprising:
   carrying out a data erasing process for erasing the data stored in the storage areas by writing erasing data of a first size in the storage areas;
   managing a state of the progress of the data erasing process;
   selecting a second size of data, among a plurality of sizes managed on the memory of the storage controller, based on the state of the progress of the data erasing progress; and
   changing the size of the erasing data from the first size to the selected second size.

10. The method according to claim 9,
    wherein the method further comprises:
    detecting a first storage area where an error related to the data erasing process with erasing data of the first size has occurred and the data erasing process is unfinished based on the state of the progress of a data erasing process managed by the processor;
    selecting the second size among a plurality of sizes managed on a memory of the storage controller; and
    carrying out again the data erasing process with erasing data of the second size for the detected first storage area.

11. The method according to claim 10,
    wherein the second size is smaller than the first size.

12. The method according to claim 9, further comprising providing a plurality of data shredding processing options to a user to erase said data.

13. The method according to claim 12, wherein the data shredding processing options include, when an error has been detected in the data:
    a) skipping a part of the error to generally shred an object range, and, then, retrying the part of the error which was skipped, wherein, during said retry of the part of the error, a block size of the data for the retry is made smaller to generally shred all parts of the error;
    b) skipping a part of the error to generally shred an object range, and, then, retrying the skipped part of the error, wherein, during the retry, a first part of the error is shredded completely before moving to a next part of the error;
    c) immediately retrying a part of the error, and then, shredding a remaining object range with a default block size, wherein, during the retry, a part of the error is shredded until a block size becomes a predetermined minimum block size; and
    d) immediately retrying a part of the error, and then shredding a remaining object range with a smaller block size, wherein during the retry, a part of the error is shredded until the block size becomes a predetermined minimum block size.

14. The method according to claim 12, further comprising providing a user with an option to select a retry number of data shredding processes to erase said data.

15. The method according to claim 9, further comprising providing a user with an option to select a retry number of data shredding processes to erase said data.

16. The method according to claim 9, wherein the storage device comprises a RAID device including a plurality of disk drives, the method further comprising, if a data shredding operation is performed to erase data in one of said plurality of disk drives, restoring the erased data in another one of said plurality of the disk drives.

17. A storage system coupled to a host computer and including a storage controller and a storage device, the storage controller being configured to allow the storage device to input and output data from and to the host computer, wherein the storage controller comprising:
 a memory; and
 a processor configured to:
 carry out a data erasing process for erasing the data stored in the storage areas by writing erasing data of a first size in the storage areas;
 manage a state of the progress of the data erasing process;
 select a second size of data, among a plurality of sizes managed on the memory of the storage controller, based on the state of the progress of the data erasing process; and
 change the size of the erasing data from the first to the selected second size.

18. The storage system according to claim 17,
 wherein the processor is configured to:
 detect a first storage area where an error related to the data erasing process with erasing data of the first size has occurred and the data erasing process is unfinished based on the state of the progress of a data erasing process managed by the processor;
 select the second size among a plurality of sizes managed on a memory of the storage controller; and
 carry out again the data erasing process with erasing data of the second size for the detected first storage area.

19. The storage system according to claim 18,
 wherein the second size is smaller than the first size.

20. The storage system according to claim 15, wherein the processor is configured to provide a plurality of data shredding processing options to erase said data, and is further configured to permit a user to select one of the data shredding processing options.

21. The storage system according to claim 20, wherein the data shredding processing options include, when an error has been detected in the data:
 a) skipping a part of the error to generally shred an object range, and, then, retrying the part of the error which was skipped, wherein, during said retry of the part of the error, a block size of the data for the retry is made smaller to generally shred all parts of the error;
 b) skipping a part of the error to generally shred an object range, and, then, retrying the skipped part of the error, wherein, during the retry, a first part of the error is shredded completely before moving to a next part of the error;
 c) immediately retrying a part of the error, and then, shredding a remaining object range with a default block size, wherein, during the retry, a part of the error is shredded until a block size becomes a predetermined minimum block size; and
 d) immediately retrying a part of the error, and then shredding a remaining object range with a smaller block size, wherein during the retry, a part of the error is shredded until the block size becomes a predetermined minimum block size.

22. The storage system according to claim 20, wherein the processor is configured to permit a user to select a retry number of data shredding processes to erase said data.

23. The storage system according to claim 17, wherein the processor is configured to permit a user to select a retry number of data shredding processes to erase said data.

24. The storage system according to claim 17, wherein the storage device comprises a RAID device including a plurality of disk drives, wherein the processor is configured so that, if data shredding is performed to erase data in one of said plurality of disk drives, the processor restores the erased data in another one of the plurality of disk drives.

* * * * *